United States Patent
Cheng

(10) Patent No.: US 11,953,208 B2
(45) Date of Patent: Apr. 9, 2024

(54) SPECTRAL POWER DENSITY CONFIGURATION IN A COOKING INSTRUMENT

(71) Applicant: Brava Home, Inc., Redwood City, CA (US)

(72) Inventor: Shih-yu Cheng, Union City, CA (US)

(73) Assignee: Brava Home, Inc., Redwood City, CA (US)

( * ) Notice: Subject to any disclaimer, the term of this patent is extended or adjusted under 35 U.S.C. 154(b) by 501 days.

(21) Appl. No.: 16/867,512

(22) Filed: May 5, 2020

(65) Prior Publication Data

US 2020/0263874 A1    Aug. 20, 2020

Related U.S. Application Data

(63) Continuation of application No. PCT/US2018/059268, filed on Nov. 5, 2018.

(Continued)

(51) Int. Cl.
*F24C 1/08* (2021.01)
*F24C 3/04* (2021.01)
(Continued)

(52) U.S. Cl.
CPC ............. *F24C 1/08* (2013.01); *F24C 3/045* (2013.01); *F24C 3/047* (2013.01); *F24C 7/043* (2013.01);
(Continued)

(58) Field of Classification Search
CPC .. F24C 1/08; F24C 3/045; F24C 3/047; F24C 7/043; F24C 7/046; F24C 7/062;
(Continued)

(56) References Cited

U.S. PATENT DOCUMENTS

| | | |
|---|---|---|
| 4,117,294 A | 9/1978 | Appelquist et al. |
| 4,473,732 A | 9/1984 | Payne |

(Continued)

FOREIGN PATENT DOCUMENTS

| | | | | |
|---|---|---|---|---|
| JP | 58040431 A | * | 3/1983 | ............... H05B 6/68 |
| JP | 02044126 A | * | 2/1990 | ............. H05B 6/687 |

(Continued)

OTHER PUBLICATIONS

European Search Report assigned to Application No. EP 18872952.9 dated Nov. 10, 2021 (11 pages).

*Primary Examiner* — Steven B McAllister
*Assistant Examiner* — Daniel E. Namay
(74) *Attorney, Agent, or Firm* — Haynes and Boone, LLP

(57) ABSTRACT

Several embodiments include a cooking instrument. The cooking instrument can include a heating system. The heating system can include one or more heating elements capable of emitting wireless energy into the cooking chamber. The cooking instrument can also include a control system. The control system can determine a heating sequence (e.g., logical instructions) to drive the heating system. The control system can then execute the heating sequence. The heating sequence can include an instruction to adjust, based on a trigger event detectable by the control system, the spectral power distribution of wireless waves emitted from a heating element in the heating system.

20 Claims, 11 Drawing Sheets

Related U.S. Application Data

(60) Provisional application No. 62/582,265, filed on Nov. 6, 2017.

(51) Int. Cl.

| | | |
|---|---|---|
| *F24C 7/04* | (2021.01) | |
| *F24C 7/06* | (2006.01) | |
| *F24C 7/08* | (2006.01) | |
| *H05B 1/02* | (2006.01) | |
| *H05B 6/70* | (2006.01) | |

(52) U.S. Cl.
CPC .............. *F24C 7/062* (2013.01); *F24C 7/065* (2013.01); *F24C 7/087* (2013.01); *F24C 7/088* (2013.01); *H05B 1/0263* (2013.01); *H05B 6/705* (2013.01)

(58) Field of Classification Search
CPC ....... F24C 7/065; H05B 6/6447; H05B 6/647; H05B 6/6482; H05B 6/68; H05B 6/705; H05B 6/12; H05B 6/6494; H05B 6/687; H05B 1/0261; H05B 47/165
USPC .................. 299/399, 460.1; 126/275 R, 19 R
See application file for complete search history.

(56) References Cited

U.S. PATENT DOCUMENTS

| | | | | |
|---|---|---|---|---|
| 4,628,284 A * | 12/1986 | Bruning | .............. | H02M 3/3388 331/86 |
| 4,728,763 A * | 3/1988 | Bell | ........................ | H05B 6/766 219/685 |
| 4,761,529 A * | 8/1988 | Tsisios | ...................... | F24C 7/046 219/400 |
| 4,882,666 A * | 11/1989 | Bruning | .............. | H02M 3/3372 363/133 |
| 4,903,183 A * | 2/1990 | Noguchi | ........... | H02M 3/33507 363/21.08 |
| 6,069,345 A | 5/2000 | Westerberg | | |
| 7,060,940 B2 * | 6/2006 | Kim | ........................ | H05B 6/642 219/400 |
| 7,060,943 B2 * | 6/2006 | Hwang | ................ | H05B 6/6482 219/492 |
| 9,289,096 B2 * | 3/2016 | Barkhouse | .............. | F23N 5/102 |
| 10,009,963 B1 * | 6/2018 | Thrun | .................. | G06K 7/10366 |
| 10,057,946 B2 * | 8/2018 | Mills | .................... | H05B 1/0263 |
| 10,061,285 B1 * | 8/2018 | Thrun | .................. | H05B 6/6447 |
| 10,085,585 B2 * | 10/2018 | Siegel | .................... | A47J 36/321 |
| 10,085,592 B1 * | 10/2018 | Cheng | .................. | H05B 6/1236 |
| 10,690,352 B2 * | 6/2020 | Smith | ...................... | F24C 7/087 |
| 10,760,794 B2 * | 9/2020 | Cheng | .................. | H05B 6/6452 |
| 10,939,511 B2 * | 3/2021 | Castillo | ................ | H05B 6/6485 |
| 2004/0035862 A1 * | 2/2004 | Hwang | ................ | H05B 6/6482 219/719 |
| 2005/0173400 A1 * | 8/2005 | Cavada | .................... | F24C 7/046 219/405 |
| 2005/0265423 A1 * | 12/2005 | Mahowald | ........... | G08B 17/125 374/121 |
| 2008/0141867 A1 * | 6/2008 | Cavada | .................... | F24C 7/08 99/332 |
| 2009/0183729 A1 * | 7/2009 | Barkhouse | ............. | G05D 23/22 126/39 BA |
| 2009/0321429 A1 * | 12/2009 | Hyde | .................... | H05B 6/6447 426/523 |
| 2010/0082025 A1 * | 4/2010 | Brannan | ................ | A61B 18/18 606/33 |
| 2010/0187224 A1 * | 7/2010 | Hyde | ..................... | H05B 6/688 219/720 |
| 2011/0002677 A1 * | 1/2011 | Cochran | ................ | H05B 3/148 392/407 |
| 2011/0114633 A1 | 5/2011 | Niklasson et al. | | |
| 2012/0103977 A1 * | 5/2012 | Qiu | ........................ | H05B 6/062 219/490 |
| 2013/0048881 A1 * | 2/2013 | Einziger | .................. | H05B 6/64 250/492.1 |
| 2013/0256302 A1 * | 10/2013 | Chu | ........................ | H05B 1/025 219/709 |
| 2016/0220057 A1 * | 8/2016 | Smith | .................. | H05B 3/0076 |
| 2016/0327280 A1 * | 11/2016 | Smith | ..................... | F24C 7/087 |
| 2017/0074522 A1 | 3/2017 | Cheng | | |
| 2017/0223774 A1 | 8/2017 | Cheng et al. | | |
| 2018/0269037 A1 * | 9/2018 | Kamarehi | .............. | H05B 6/645 |
| 2019/0313486 A1 * | 10/2019 | Castillo | .................... | H05B 6/80 |

FOREIGN PATENT DOCUMENTS

| | | | | |
|---|---|---|---|---|
| JP | 07220865 A * | 8/1995 | .............. | H05B 6/68 |
| JP | 07332678 A * | 12/1995 | ........... | H05B 6/6411 |
| JP | 09303787 A * | 11/1997 | ........... | H05B 6/6482 |
| JP | 2001082744 A * | 3/2001 | ........... | H05B 6/6411 |
| JP | 2009180392 A * | 8/2009 | ........... | H05B 6/6482 |
| KR | 20010015601 A * | 3/2000 | ........... | H05B 3/0076 |
| WO | WO-2010102261 A1 * | 9/2010 | ............... | A21B 1/42 |
| WO | WO-2018026846 A1 * | 2/2018 | ........... | F24C 15/005 |

\* cited by examiner though here may be employed without departing from the principles of embodiments described herein.
SPECTRAL POWER DENSITY CONFIGURATION IN A COOKING INSTRUMENT

CROSS-REFERENCE TO RELATED APPLICATIONS

The present application is a continuation of International Patent Application No. PCT/US2018/059268, entitled "SPECTRAL POWER DENSITY CONFIGURATION IN A COOKING INSTRUMENT", filed Nov. 5, 2018, which claims priority to and the benefit of U.S. Provisional Patent Application No. 62/582,265, filed Nov. 6, 2017 and entitled "SPECTRAL POWER DISTRIBUTION CONFIGURABLE COOKING INSTRUMENT," which are hereby incorporated by reference in their entirety.

TECHNICAL FIELD

Various embodiments relate to cooking instruments, such as ovens.

BACKGROUND

The art of cooking remains an "art" at least partially because of the food industry's inability to help cooks to produce systematically award worthy dishes. To make a full course meal, a cook often has to use multiple cooking instruments, understand the heating patterns of the cooking instruments, and make dynamic decisions throughout the entire cooking process based on the cook's observation of the target food's progression (e.g., transformation due to cooking/heating). Because of this, while some low-end meals can be microwaved (e.g., microwavable meals) or quickly produced (e.g., instant noodles), traditionally, truly complex meals (e.g., steak, kebabs, sophisticated dessert, etc.) cannot be produced systematically using conventional cooking instruments automatically. The industry has yet been able to create an intelligent cooking instrument capable of automatically and consistently producing complex meals with precision, speed, and lack of unnecessary human intervention.

Figure 1:
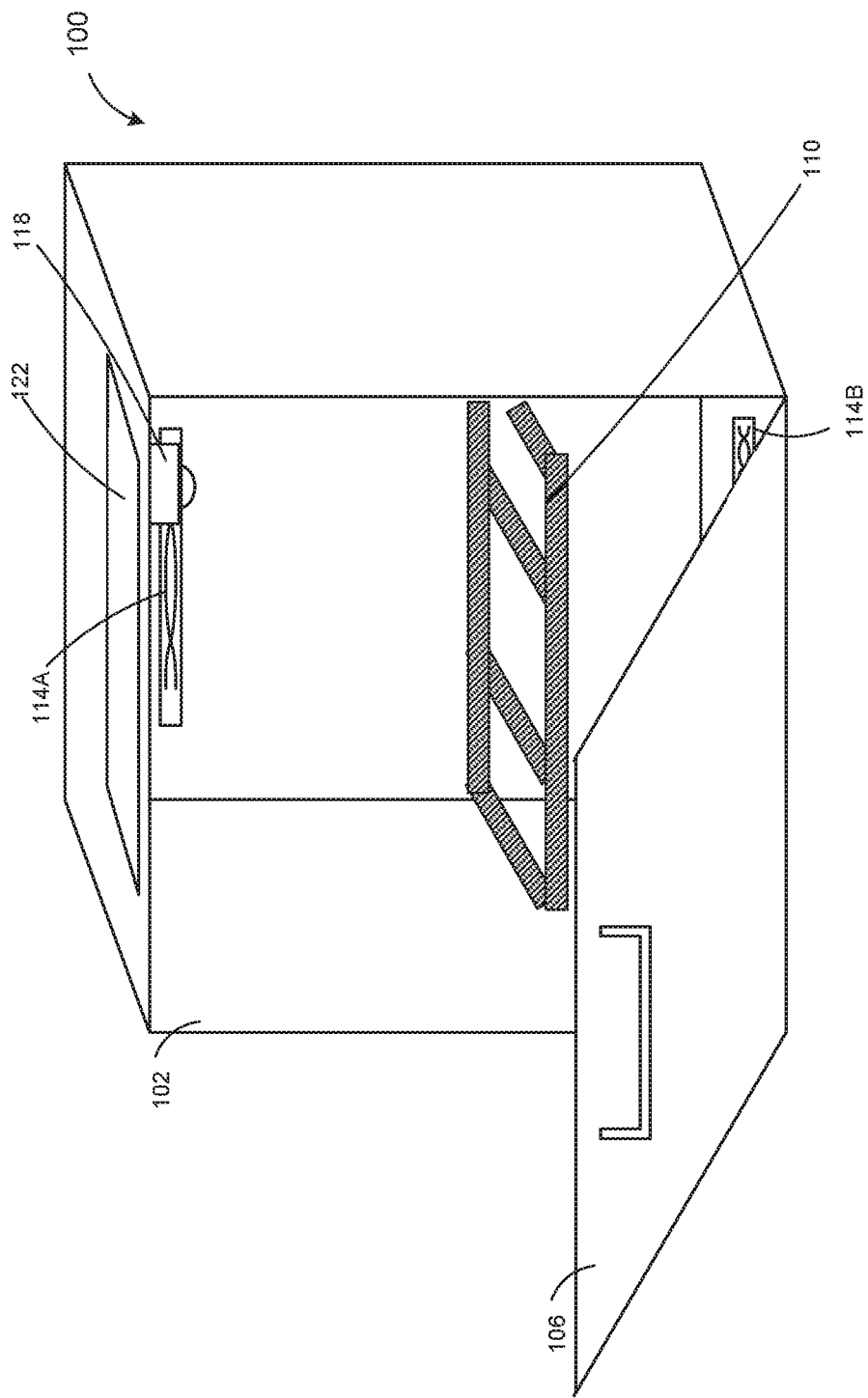
FIG. 1 is a structural diagram of a perspective view of a cooking instrument, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

A conventional oven cooks food within its chamber utilizing a single setting over a period of time. Cooking a complex dish (e.g., having multiple components) with such oven is either restricted by how well cooked all of the components together as a whole is or requires that only a subset of components be cooked at one time in the oven. Disclosed is a cooking instrument capable of implementing multiple cooking zones in its cooking chamber, each cooking zone capable of applying a different heating sequence.

Several embodiments include a cooking instrument. The cooking instrument can include a heating system. The heating system can include one or more heating elements capable of emitting wireless energy into the cooking chamber. The cooking instrument can also include a control system. The control system can determine a heating sequence to drive the heating system. The control system can then execute the heating sequence. The heating sequence can include an instruction to adjust, based on a trigger event detectable by the control system, the spectral power distribution of wireless waves emitted from a heating element in the heating system. The control system can adjust the spectral power distribution by generating a control signal to a power supply or the heating system to pulse modulate the power provided to the heating element. The spectral power distribution can be a function of temperature of the heating element. By driving the temperature of the heating element to a target range and maintaining the temperature within the target range by the proper pulse modulation setting, the cooking instrument can tune the spectral power distribution of the heating element.

The heating system can be determined based on a food cooking recipe or a foodstuff selected or identified by the cooking instrument. A food cooking recipe is a set of parameters and configurations to the cooking instrument in order to prepare and cook a foodstuff dish. A food cooking recipe can also include one or more heating sequences or one or more instructions to generate such heating sequences. In some embodiments, each heating sequence in a food cooking recipe corresponds to a set of logical instructions to drive the heating system prior to some amount of user intervention is needed to continue executing the food cooking recipe.

A heating sequence is a set of logical instructions to drive a heating system of the cooking instrument. The logical instructions can include configuration parameters specifying a particular setting of pulse modulation used to drive one or more heating elements of the heating system. The logical instructions can include one or more logical branches, each logical branch with one or more instructions of driving the heating system. Whether to execute a logical branch (e.g., execute once or repeatedly execute) can be determined by a trigger event. The trigger event can be a conditional precedent or a conditional subsequent. The logical instructions can include feedback control instructions to adjust the configuration parameters of the heating system.

FIG. 1 is a structural diagram of a perspective view of a cooking instrument 100, in accordance with various embodiments. The cooking instrument 100 can include a chamber 102 having a door 106. At least one cooking platform 110 is disposed inside the chamber 102. The cooking platform 110 can be a tray, a rack, or any combination thereof.

The cooking instrument 100 can include a heating system (not labeled in FIG. 1). The heating system can include one or more heating elements 114 (e.g., a heating element 114A, a heating element 114B, etc., collectively as the "heating elements 114"). The chamber 102 can be lined with the heating elements 114. Each of heating elements 114 can include a wavelength controllable filament assembly. The wavelength controllable filament assembly is capable of independently adjusting an emission spectral power distribution (hence also peak frequency and peak wavelength), emission power, and/or emission signal pattern in response to a command from a computing device (not shown) of the cooking instrument 100.

In several embodiments, the chamber 102 is windowless. That is, the chamber 102, including the door 106, is entirely enclosed without any transparent (and/or semitransparent) parts when the door 106 is closed. For example, the chamber 102 can be sealed within a metal enclosure (e.g., with thermal insulation from/to the outside of the chamber 102) when the door 106 is closed. A camera 118 can be attached to an interior of the chamber 102. In some embodiments, the camera 118 is attached to the door 106. For example, the camera 118 can face inward toward the interior of the chamber 102 when the door 106 is closed and upward when the door 106 is opened as illustrated. In some embodiments, the camera 118 is installed on the ceiling (e.g., top interior surface) of the chamber 102. The camera 118 can be attached to the door 106 or proximate (e.g., within three inches) to the door 106 on the ceiling of the chamber 102 to enable easy cleaning, convenient scanning of labels, privacy, heat damage avoidance, etc.

In several embodiments, each of the heating elements 114 includes one or more wavelength-controllable filament assemblies at one or more locations in the chamber. In some embodiments, each of the one or more wavelength-controllable filament assemblies is capable of independently adjusting its emission spectral power distribution (e.g., peak emission frequency) and/or its emission power. For example, the peak emission frequency of the wavelength-controllable filament assemblies can be tuned within a broad band range (e.g. from 20 terahertz to 300 terahertz). Different frequencies can correspond to different penetration depth for heating the food substances, the cooking platform 110 or other items within the chamber 102, and/or parts of the cooking instrument 100.

The heating elements 114 can be controlled to have varying power, either by using a rapidly switching pulse width modulation (PWM)-like electronics by having a relay-like control that turns on and off relatively quickly compared to the thermal inertia of the heating filament itself. The change in peak emission frequency can be directly correlated with the amount of power delivered into the heating element. More power correlates to higher peak emission frequency. In some cases, the cooking instrument 100 can hold the power constant while lowering the peak emission frequency by activating more heating elements, each at a lower power. The cooking instrument 100 can independently control peak emission frequencies of the filament assemblies and power them by driving these filament assemblies individually.

In some embodiments, using the max power for each individual heating element to achieve the highest emission frequency is challenging because the power consumption may be insufficiently supplied by the AC power supply (e.g., because it would trip the fuse). In some embodiments, this is resolved by sequentially driving each individual heating element at maximum power instead of driving them in parallel with reduced power. Intermediate peak emission frequency can be achieved by having a combination of sequential driving and parallel driving.

In some embodiments, the camera 118 includes an infrared sensor to provide thermal images to the computing device as feedback to a dynamic heating sequence (e.g., a heat adjustment algorithm). In some embodiments, the cooking instrument 100 includes multiple cameras. In some embodiments, the camera 118 includes a protective shell. In some embodiments, the heating elements 114 and the camera 118 are disposed in the chamber 102 such that the camera 118 is not directly between any pairing of the heating elements. For example, the heating elements 114 can be disposed along two vertical walls perpendicular to the door 106. The heating elements 114 can be quartz tubes (e.g., with heating filaments therein) that run horizontally on the vertical walls and perpendicular to the door 106.

In some embodiments, a display 122 is attached to the door 106. In some embodiments, the display 122 is attached to an outward-facing surface of the chamber 102 other than the door 106 (as shown). The display 122 can be a touchscreen display. The display 122 can be attached to an exterior of the chamber 102 on an opposite side of the door 106 from the camera 118. The display 122 can be configured to display a real-time image or a real-time video of the interior of the chamber captured by and/or streamed from the camera 118.

Figure 2:
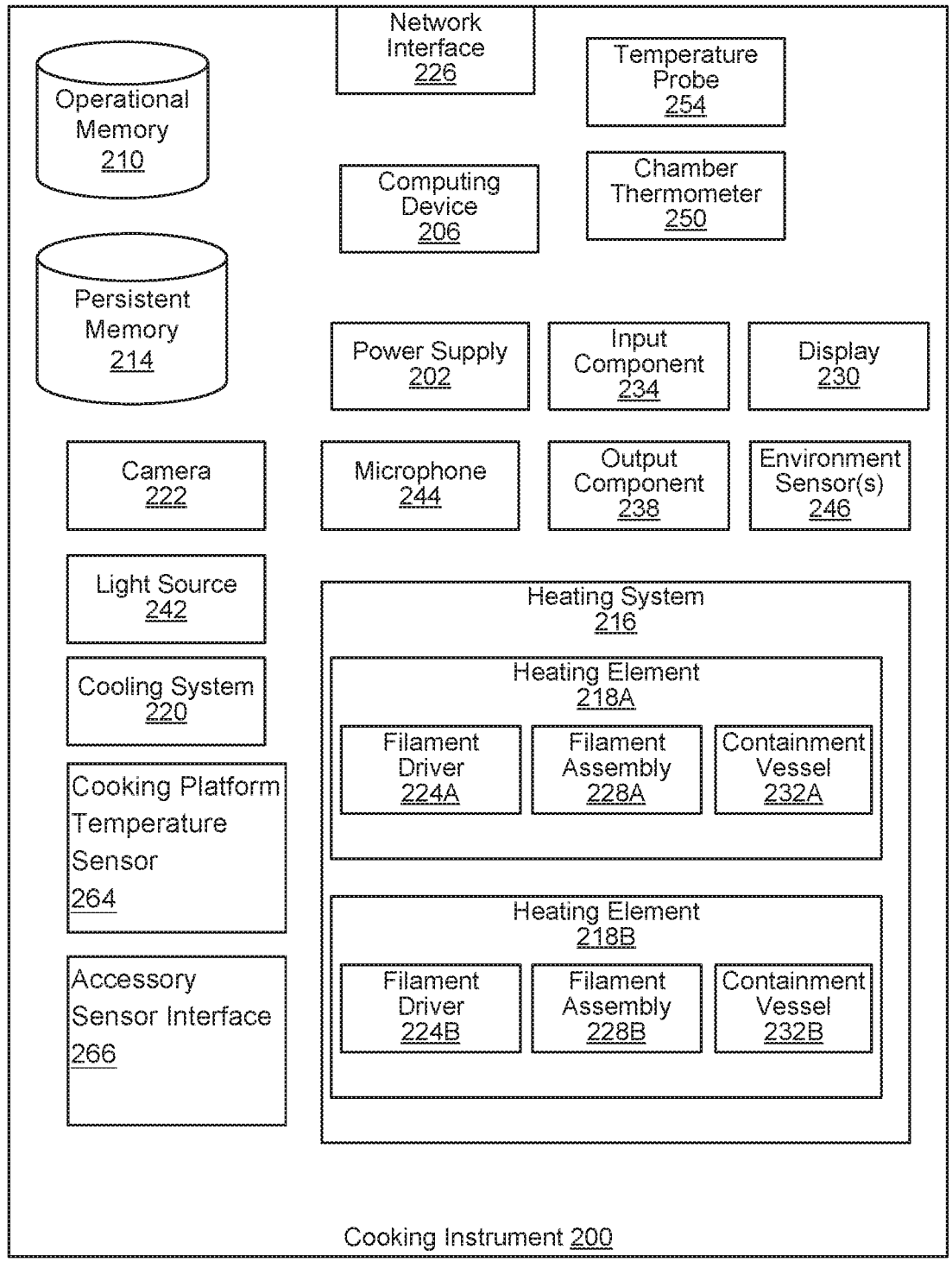
FIG. 2 is a block diagram illustrating physical components of a cooking instrument, in accordance with various embodiments.

FIG. 2 is a block diagram illustrating physical components of a cooking instrument 200 (e.g., the cooking instrument 100), in accordance with various embodiments. The cooking instrument 200 can include a power supply 202, a computing device 206, an operational memory 210, a persistent memory 214, a heating system 216 with one or more heating elements (e.g., a heating element 218A, a heating element 218B, etc., collectively as the "heating elements 218"), a cooling system 220, a camera 222 (e.g., the camera 118), a network interface 226, a display 230 (e.g., the display 122), an input component 234, an output component 238, a light source 242, a microphone 244, one or more environment sensors 246, a chamber thermometer 250, a temperature probe 254, or any combination thereof. The heating elements 218 can be the heating elements 114. In some embodiments, each of the heating elements 218 is individually tunable (e.g., by the computing device 206) to change its emission spectral power distribution independent of others.

The computing device 206, for example, can be a control circuit. The computing device 206 serves as the control system for the cooking instrument 200. The control circuit can be an application-specific integrated circuit or a circuit with a general-purpose processor configured by executable instructions stored in the operational memory 210 and/or the persistent memory 214. The computing device 206 can control all or at least a subset of the physical components and/or functional components of the cooking instrument 200.

The power supply 202 provides the power necessary to operate the physical components of the cooking instrument 200. For example, the power supply 202 can convert alternating current (AC) power to direct current (DC) power for the physical components. In some embodiments, the power supply 202 can run a first powertrain to the heating elements 218 and a second powertrain to the other components. In some cases, the first powertrain is an AC powertrain and the second powertrain is a DC powertrain.

The computing device 206 can control peak wavelengths and/or spectral power distributions (e.g., across different wavelengths) of the heating elements 218. The computing device 206 can implement various functional components (e.g., see FIG. 3) to facilitate operations (e.g., automated or semi-automated operations) of the cooking instrument 200. For example, the persistent memory 214 can store one or more cooking recipes. Each cooking recipe can include one or more heating sequences containing executable instructions (e.g., executable by the computing device 206) to drive the heating elements 218. The operational memory 210 can provide runtime memory to execute the functional components of the computing device 206. In some embodiments, the persistent memory 214 and/or the operational memory 210 can store image files or video files captured by the camera 222.

The heating elements 218 can be wavelength controllable (e.g., capable of changing its spectral power distribution). For example, the heating elements 218 can include quartz tubes, each enclosing one or more heating filaments. In various embodiments, the side of the quartz tubes facing toward the chamber wall instead of the interior of the chamber is coated with a heat resistant coating. The operating temperature of the heating filaments can be extremely high. Hence, the cooling system 220 can provide cooling (e.g., convectional or otherwise) to prevent the heat resistant coating from melting or vaporizing.

The heating elements 218 can respectively include filament drivers (e.g., respectively a filament driver 224A and a filament driver 224B, collectively as the "filament drivers 224"), filament assemblies (e.g., respectively filament assembly 228A and filament assembly 228B, collectively as the "filament assemblies 228B"), and containment vessels (e.g., respectively containment vessel 232A and containment vessel 232B, collectively as the "containment vessels 232"). For example, each heating element can include a filament assembly housed by a containment vessel. The filament assembly can be driven by a filament driver. In turn, the filament driver can be controlled by the computing device 206. For example, the computing device 206 can instruct the power supply 202 to provide a set amount of power to the filament driver. In turn, the computing device 206 can instruct the filament driver to drive the filament assembly to generate electromagnetic waves (i.e., a form of wireless electromagnetic energy) with one or more selected peak wavelengths and/or other particular characteristics defining a spectral power distribution type.

The camera 222 serves various functions in the operation of the cooking instrument 200. For example, the camera 222 and the display 230 together can provide a virtual window to the inside of the chamber despite the cooking instrument 200 being windowless. The camera 222 can serve as a food package label scanner that configures the cooking instrument 200 by recognizing a machine-readable optical label of the food packages. In some embodiments, the camera 222 can enable the computing device 206 to use optical feedback when executing a cooking recipe. In several embodiments, the light source 242 can illuminate the interior of the cooking instrument 200 such that the camera 222 can clearly capture an image of the food substance therein.

The network interface 226 enables the computing device 206 to communicate with external computing devices. For example, the network interface 226 can enable Wi-Fi or Bluetooth. A user device can connect with the computing device 206 directly via the network interface 226 or indirectly via a router or other network devices. The network interface 226 can connect the computing device 206 to an external device with Internet connection, such as a router or a cellular device. In turn, the computing device 206 can have access to a cloud service over the Internet connection. In some embodiments, the network interface 226 can provide cellular access to the Internet.

The display 230, the input component 234, and the output component 238 enable a user to directly interact with the functional components of the computing device 206. For example, the display 230 can present images from the camera 222. The display 230 can also present a control interface implemented by the computing device 206. The input component 234 can be a touch panel overlaid with the display 230 (e.g., collectively as a touchscreen display). In some embodiments, the input component 234 is one or more mechanical devices (e.g., buttons, dials, switches, or any combination thereof). In some embodiments, the output component 238 is the display 230. In some embodiments, the output component 238 is a speaker or one or more external lights.

In some embodiments, the cooking instrument 200 includes the microphone 244, and/or the one or more environment sensors 246. For example, the computing device 206 can utilize the audio signal, similar to images from the camera 222, from the microphone 244 as dynamic feedback to adjust the controls of the heating elements 218 in real-time according to a heat adjustment algorithm (e.g., a part of a dynamic heating sequence). In one example, the computing device 206 can detect an audio signal indicative of a fire alarm, a smoke alarm, popcorn being popped, or any combination thereof. For example, the computing device 206 can adjust the heating system 216 according to the detected audio signal, such as turning off the heating elements 218 in response to detecting an alarm or in response to detecting a series of popcorn noise followed by silence/low noise. The environment sensors 246 can include a pressure sensor, a humidity sensor, a smoke sensor, a pollutant sensor, or any combination thereof. The computing device 206 can also utilize the outputs of the environment sensors 246 as dynamic feedback to adjust the controls of the heating elements 218 in real-time according to a heating sequence instruction (e.g., a heat adjustment algorithm).

In some embodiments, the cooking instrument 200 includes the chamber thermometer 250, the temperature probe 254, a cooking platform temperature sensor 264, an accessory sensor interface 266, or any combination thereof. The cooking platform temperature sensor 264 can measure the temperature at one or more zones on a cooking platform (e.g., the cooking platform 110). The cooking platform temperature sensor 264 can be embedded in or attached to the cooking platform. The accessory sensor interface 266 can be a wired or wireless interface capable of receiving sensor signals from an accessory of the cooking instrument 200. For example, an accessory (not shown) can include a temperature sensor that reports the temperature experienced at the accessory to the computing device 206. For example, the computing device 206 can utilize the temperature readings from the chamber thermometer 250, the temperature probe 254, the cooking platform temperature sensor 264, the accessory sensor interface 266, or any combination thereof, as dynamic feedback to adjust the controls of the heating elements 218 in real-time according to a heat adjustment algorithm. The temperature probe 254 can be adapted to be inserted into food to be cooked by the cooking instrument 200. The computing device 206 can also utilize the outputs of the temperature probe 254 as dynamic feedback to adjust the controls of the heating elements 218 in real-time according to a heat adjustment algorithm. For example, the heat adjustment algorithm of a cooking recipe can dictate that the food should be heated at a preset temperature for a preset amount time according to the cooking recipe.

Example Implementations

In some example implementations, the heating system 216 includes at least a tunable heating element (e.g., one of the heating elements 218) capable of emitting wireless energy into a cooking chamber (e.g., the cooking chamber 102). To start a process of cooking food, the computing device 206 (e.g., the control system of the cooking instrument 200) can first determine (e.g., identify, select, or infer) a food substance or a food cooking recipe. For example, the computing device 206 can determine the food substance as being in the cooking chamber or intended to be in the cooking chamber. The determination of the food substance can be by image recognition (e.g., using data captured by the camera 222), user input (e.g., using data from the network interface 226 and/or from the input component 234), voice recognition (e.g., using data captured by from a microphone 244), or any combination thereof.

The computing device 206 can be configured to generate, based on an identity of the food substance or the food cooking recipe, a heating sequence to drive the heating system 216. For example, the heating sequence includes or references parameters to determine how to provide power to the tunable heating element to cause the tunable heating element to emit according to a target spectral power distribution. When generating the heating sequence, the target spectral power distribution can be selected to match the absorption spectrum of the food substance or an intermediary cooking medium (e.g., air, cooking platform/tray, water surrounding the food substance, etc.) for cooking the food substance.

In some cases, the computing device 206 can select the food cooking recipe based on identification of food substance by the computing device 206. In some cases, the computing device 206 can infer an expectation of a certain type of food substance to be cooked, in response to receiving a user selection of the food cooking recipe. In some cases, the computing device 206 is configured to generate the heating sequence neither with the identification of food substance nor with an inferred expectation of what food substance is expected to be cooked.

The computing device 206 can be configured to detect trigger events dictated by or specified in one or more heating sequences of one or more food cooking recipes. For example, the logic of the heating sequence can include an instruction to adjust a spectral power distribution of the wireless energy emitted from the tunable heating element in response to the computing device 206 detecting a particular trigger event. After the heating sequence is initiated, the computing device 206 starts to monitor for the detection of the trigger event. In response to detecting the trigger event, the computing device 206 can configure the heating system to adjust the spectral power distribution of the emitted wireless energy from the tunable heating element. In some embodiments, the heating sequence includes an instruction to simultaneously adjust, based on a trigger event detectable by the computing device 206, a plurality of spectral power distributions of wireless waves emitted respectively from the multiple heating elements 218 in the heating system 216. In some cases, the instruction can specify a target spectral power distribution as corresponding to one of the trigger event. In some cases, the instruction can specify a target object category (e.g., defined by foodstuff shape, foodstuff size, foodstuff material, or any combination thereof) associated with the target spectral power distribution as corresponding to one of the trigger event.

In some embodiments, the persistent memory 214 stores a logic function or a database (e.g., a lookup table) that associates target object categories (e.g., defined by material, size, shape, etc.) respectively with wavelength-specific configurations (e.g., each wavelength-specific configuration associated with a target spectral power distribution and/or how to adjust the spectral power distribution to the target spectral power distribution). Instructions in a heating sequence can reference the logic function or the database to identify a wavelength-specific configuration associated with a target spectral power distribution. A wavelength-specific configuration can be associated with a set of one or more parameters that configure the computing device 206 to send a control signal to the heating system 216. The control signal can correspond to characteristics indicative of a target spectral power distribution of waves emitted from the tunable heating element.

A wavelength-specific configuration can be associated with one or more absorbent wavelengths, transmissive wavelengths, or reflective wavelengths of one or more materials in or that are part of the cooking chamber. For example, the materials can include food, glass, metal, air, or any combination thereof. The computing device 206 can be configured to determine that a target foodstuff category (e.g., user-specified, recipe-specified, or image-sensor-identified) or a target intermediary cooking medium is in a target object category and drive the tunable heating element according to the wavelength-specific configuration associated with the target object category according to the database in the persistent memory 214. In some embodiments, the absorptivity characteristic of the target object category allows for multiple wavelength-specific configurations. In those embodiments, a single wavelength-specific configuration can be selected by the computing device 206 to optimize for available power density (e.g., cooking speed) based on the absorptivity band(s) of the target object category.

In some embodiments, aside from adjusting the spectral power distribution, the heating sequence can also include instructions to adjust the intensity, duration, pulse pattern, or any combination thereof, of the wireless energy emitted from the tunable heating element. Execution of the instruction can be dynamic or sequentially timed. That is, the trigger event can be a time-based event, a modeled or simulated event, an event triggered by neural network, a user indicated event, or a sensor data indicated event.

In various embodiments, the spectral power distribution of waves emitted from a tunable heating element is adjusted by modulating power provided to the tunable heating element to tune the temperature of the tunable heating element to a particular range. In some embodiments, the power supply 202 is adapted to supply electrical power to the tunable heating element according to instructions from the computing device 206. The power supply 202 can draw power from an AC wall outlet. For example, the power supply 202 can include an AC power plug adapted to connect with the wall outlet. In some embodiments, the power supply 202 provides pulse modulated or phase-fired control of electrical power to the tunable heating element. For example, the pulse modulated electrical power can be modulated DC power or rectified half-cycle AC power.

Figure 8:
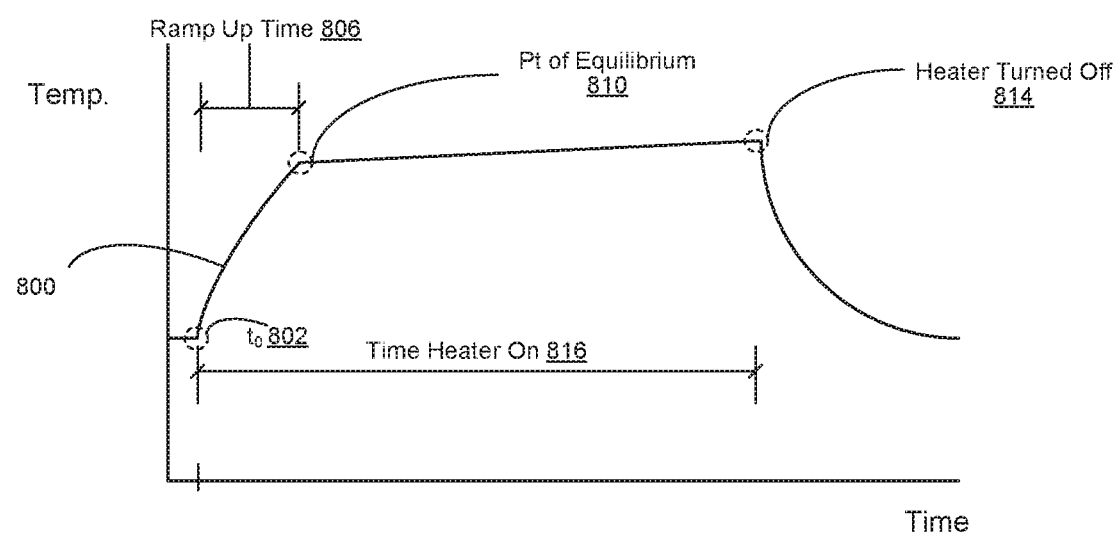
FIG. 8 is a graph illustrating a temperature trace of a heating element over time using an unmodulated method of driving the heating element.

In some cases, the computing device 206 can adjust the spectral power distribution of the tunable heating element by adjusting a duration that the power supply 202 is supplying power to the tunable heating element. For example, the persistent memory 214 can store a driver parameter. The driver parameter can be associated with a target spectral power distribution or at least a characteristic thereof. The driver parameter can be correlated with a variation of the spectral power distribution as a function of time that the tunable heating element is continuous turned on without a substantial pause (e.g., duration of what constitute "substantial pause" can be stored as a parameter as well). The computing device 206 can adjust the duration based on the driver parameter and the known time that the tunable heating element has been continuously turned on. Alternatively, the driver parameter can be correlated with variation to the spectral power distribution as a function of an operational core temperature of the tunable heating element. The computing device 206 can adjust the duration based on the driver parameter and the known operational core temperature of the tunable heating element. The function represented by the driver parameter advantageously enables the computing device 206 to tune the spectral power distribution emitted from a single heating element. The applied power duty cycle in combination with known physical characteristics can be used to estimate operating core temperature of the tunable heating element because temperature increases over time whenever a tunable heating element is connected to electrical power up until equilibrium temperature is reached. Equilibrium is when temperature dissipation is substantially equal and opposite to temperature increase. This effect is illustrated in the graph of FIG. 8.

In some embodiments, the power supply 202 includes a power control mechanism capable of switching power on or off to the tunable heating element. In some embodiments, the power control mechanism is a binary power switch. In some embodiments, the power control mechanism provides more than two states of power connections, such as an off state, a maximum power state, and one or more reduced power states. In these embodiments, the computing device 206 is configured to adjust the spectral power distribution of the tunable heating element to a target spectral power distribution by pulse modulating using the power control mechanism (e.g., according to a control signal from the control system to the power control mechanism). For example, the computing device 206 can pulse modulate the power control mechanism until a target core temperature of the tunable heating element is reached. The persistent memory 214 can store an association between the target spectral power distribution and the target core temperature such that the computing device 206 can determine that they correspond to each other during operation of the heating system 216. The persistent memory 214 can store an association between a pulse modulation configuration (e.g., pulse frequency, pulse width/duty cycle, pulse intensity, or any combination thereof) and a target spectral power distribution.

The computing device 206 can be configured to slow (e.g., decrease in frequency) the pulse modulating of the power control mechanism when an estimated operational temperature of the tunable heating element is above a threshold temperature, when the power control mechanism has been in a particular state for more than a threshold duration, and/or when the power control mechanism has been in a particular state for more than a threshold amount in a preset duration. The particular state can be either an "on" state or an "off state". The slowing of the pulse modulation can include stopping the pulse modulation. Threshold amount can be measured as a fraction or a percentage within preset duration that the power control mechanism is in the particular state. Similar to the mechanism of slowing, the computing device 206 can be configured to speed up (e.g., decrease in frequency) the pulse modulating of the power control mechanism when an estimated operational temperature of the tunable heating element is below a threshold temperature, when the power control mechanism has been in a particular state for less than a threshold duration, and/or when the power control mechanism has been in a particular state for less than a threshold amount in a preset duration.

Inrush Current Mitigation

As temperature rapidly rises in the heating element, the electrical resistance of the heating element also rapidly decreases. Accordingly, the electrical current consumed by the heating element at the beginning of each electrical pulse may experience a sudden peak. Accordingly, the relay controlling the power connection to the particular heating element can include a temperature dependent circuit element (e.g., temperature dependent resistor) such that the initial rise temperature does not cause an electric current consumption peak that would blow the circuit breaker of the AC power source feeding the heating element.

Power consumption of a filament used in the tunable heating element varies as a function of the temperature of the heating element. The spectral power distribution (SPD) function can be a substantially stateless function over a short time period and a function of temperature during that short time period. Because the temperature of the heating element also increases over time until equilibrium is reached, the SPD function can also be estimated based on how long the heating element has been turned on (e.g., pulse width and/or duty cycle of a pulse modulation scheme). Accordingly, a food cooking recipe with a corresponding heating sequence that changes SPD frequently would require frequent changes to the pulse frequency of the pulse modulation. Because the power consumption over time of a tunable heating element can follow a decay whenever the heating element is turned on, frequent switching of the power control mechanism hence corresponds to frequent current draw peaks right when a heating element is turned on. Current draw peaks have the tendency to break the electronic circuitry in the cooking instrument 200.

In some embodiments, the power supply 202 includes a temperature-dependent resistor electronically coupled to the power control mechanism. In some embodiments, the computing device 206 includes a temperature-dependent resistor electronically coupled to the power control mechanism. The temperature-dependent resistor (e.g., a thermistor or a resistor selected for its temperature dependence) can limit in-rush current due to fast switching. In some embodiments, the power supply 202 or the computing device 206 includes a digital power chopper with an adjustable chop rate to limit in-rush current or have higher resolution of the core temperature (e.g., enable the computing device 206 to fine tune the spectral power distribution of the tunable heating element).

Figure 3:
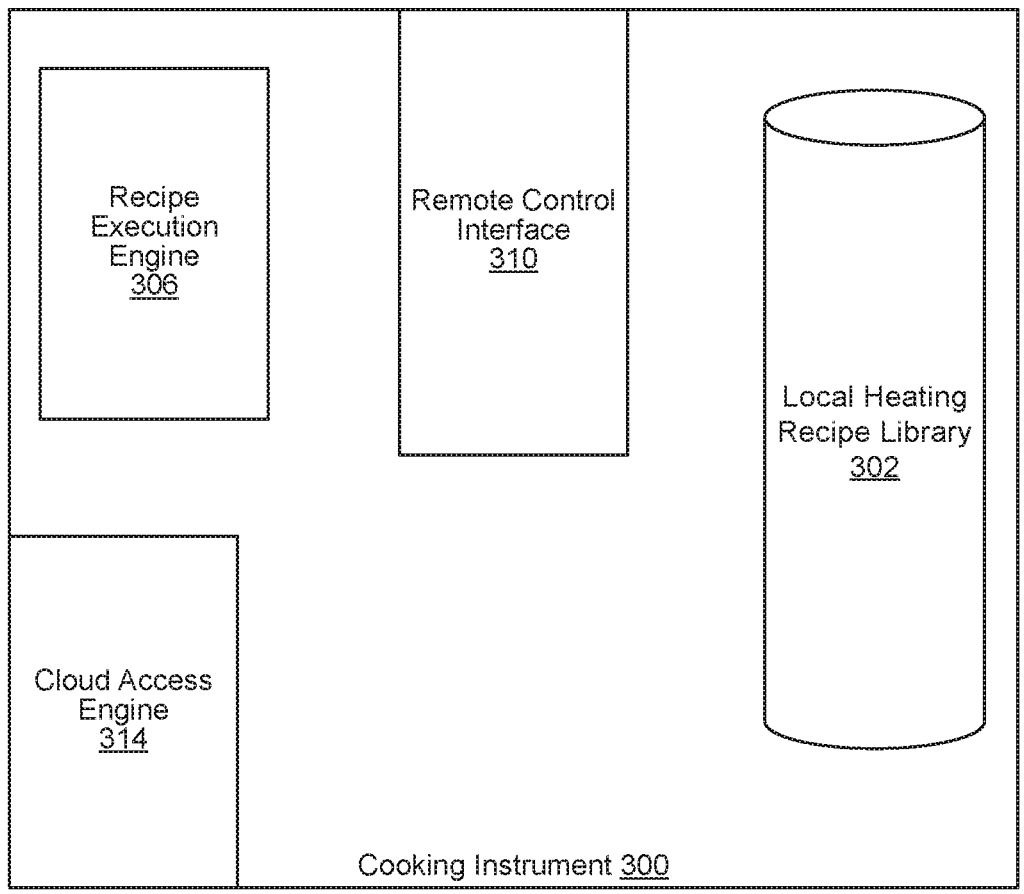
FIG. 3 is a block diagram illustrating functional components of a cooking instrument, in accordance with various embodiments.

FIG. 3 is a block diagram illustrating functional components of a cooking instrument 300 (e.g., the cooking instrument 100 and/or the cooking instrument 200), in accordance with various embodiments. For example, the functional components can run on the computing device 206 or one or more specialized circuits. For example, the cooking instrument 300 can implement at least a cooking recipe library 302, a recipe execution engine 306, a remote control interface 310, a cloud access engine 314, or any combination thereof. The cooking recipe library 302 stores one or more cooking recipes, each cooking recipe including one or more heating sequences respectively for one or more portions of food. The recipe execution engine 306 interprets the executable instructions from the cooking recipes and its heating sequences. The remote control interface 310 enables the functional components of the cooking instrument 300 to be controlled by an external user device (not shown). The remote control interface 310 can enable the external user device to configure the functional components of the cooking instrument 300 or to request information from the external user device. For example, the remote control interface 310 can connect with the external user device via the network interface 226. The cloud access engine 314 enables the cooking instrument 300 to communicate with a backend server system (not shown) to configure the functional components of the cooking instrument 300 or to request information from the backend server system.

In some examples, the recipe execution engine 306 can load and interpret a set of instructions to implement a cooking recipe, including executing a heating sequence (e.g., dynamic segments, static segments, or any combination thereof). For example, the recipe execution engine 306 can analyze an image from a camera (e.g., the camera 222) to determine whether a door (e.g., the door 106) is open. For example, the image from the camera may be illuminated by a specific color of a specific light source (e.g., the light source 242) when facing toward an interior of the cooking instrument 300. In some examples, the recipe execution engine 306 is configured to analyze an image from the camera to determine whether a machine-readable optical label is within the image. For example, the recipe execution engine 306 can be configured to select a cooking recipe from the cooking recipe library 302 based on the machine-readable optical label. In this example, the remote control interface 310 is configured to send a message to an external user device to confirm the automatically selected cooking recipe. In some examples, the recipe execution engine 306 is configured to present the cooking recipe for confirmation on a local display and to receive the confirmation a local input component when the cooking recipe is displayed. In response to the selection of the cooking recipe, the recipe execution engine 306 can execute a heating sequence in accordance of the cooking recipe by controlling the heating elements. The heat adjustment algorithm is capable of dynamically controlling the heating elements 218 (e.g., adjusting output power, spectral power distribution, and/or peak wavelength(s)) in real-time in response to changing input variables (e.g., real-time sensor inputs, user inputs, external user device or backend server system provided parameters, or any combination thereof).

The remote control interface 310 can be used to interact with a user. For example, a user device (e.g., a computer or a mobile device) can connect to the remote control interface via the network interface 226. Via this connection, the user can configure the cooking instrument 300 in real-time. In one example, the user can select a cooking recipe via a user-device-side application running on the user device. The user-device-side application can communicate the remote control interface 310 to cause the cooking instrument 300 to execute the selected cooking recipe. The cloud access engine 314 can enable the cooking instrument 300 to access a cloud service to facilitate execution of a cooking recipe and/or update the cooking recipes in the cooking recipe library 302.

Components (e.g., physical or functional) associated with the cooking instrument (e.g., the cooking instrument 100, the cooking instrument 200, and/or the cooking instrument 300) can be implemented as devices, modules, circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the components may operate individually and independently of other components. Some or all of the components may be executed on the same host device or on separate devices. The separate devices can be coupled through one or more communication channels (e.g., wireless or wired channel) to coordinate their operations. Some or all of the components may be combined as one component. A single component may be divided into sub-components, each sub-component performing separate method step or method steps of the single component.

In some embodiments, at least some of the components share access to a memory space. For example, one component may access data accessed by or transformed by another component. The components may be considered "coupled" to one another if they share a physical connection or a virtual connection, directly or indirectly, allowing data accessed or modified by one component to be accessed in another component. In some embodiments, at least some of the components can be upgraded or modified remotely (e.g., by reconfiguring executable instructions that implements a portion of the functional components). The systems, engines, or devices described herein may include additional, fewer, or different components for various applications.

Figure 4:
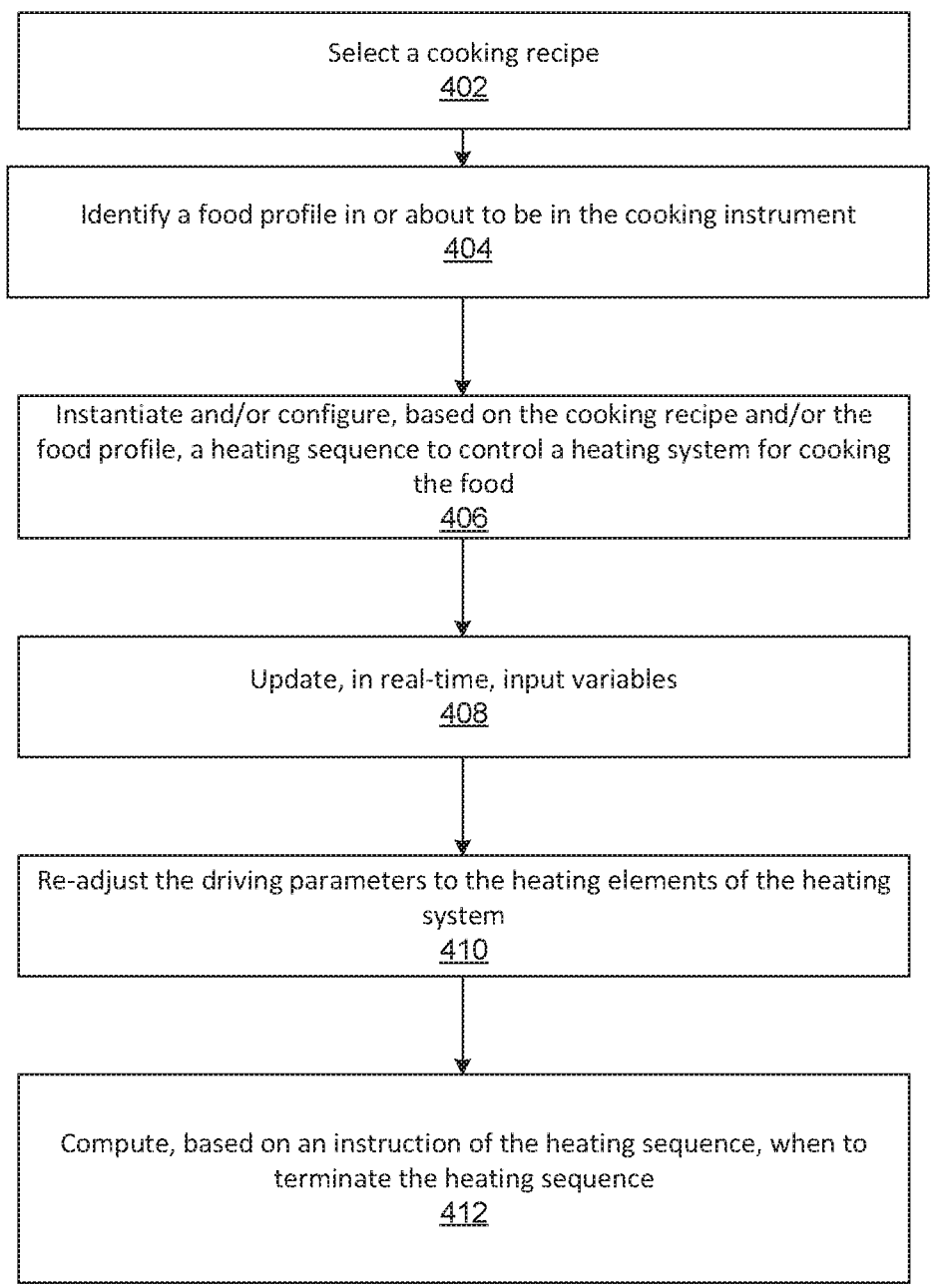
FIG. 4 is a flowchart illustrating a method of operating a cooking instrument to cook food, in accordance with various embodiments.

FIG. 4 is a flowchart illustrating a method 400 of operating the cooking instrument (e.g., the cooking instrument 100, the cooking instrument 200, and/or the cooking instrument 300) to cook food, in accordance with various embodiments. The method 400 can be controlled by a computing device (e.g., the computing device 206).

At step 402, the computing device can select a cooking recipe (e.g., from a local cooking recipe library stored in the local memory (e.g., the operational memory 210 and/or the persistent memory 214) of the computing device and/or the cooking instrument, in an external cooking recipe library implemented by a cloud service accessible through a network interface (e.g., the network interface 226), or in the memory of another external source connected to the computing device). Optionally, at step 404, the computing device can identify a food profile in or about to be in the cooking instrument. For example, the computing device can utilize a camera to identify the food profile (e.g., performing image recognition of the food or scanning a digital label attached to an outer package of the food). The food profile can identify the size of the food, the weight of the food, the shape of the food, the current temperature of the food, or any combination thereof.

At step 406, the computing device can instantiate and/or configure, based on the cooking recipe and/or the food profile, a heating sequence to control a heating system for cooking the food. The heating sequence can include one or more dynamic segments defined by a heat adjustment algorithm. The heat adjustment algorithm can specify how to adjust the driving parameters of one or more heating elements in the cooking instrument based on input variables that may change over time. Input variables can include time lapsed (e.g., time from when the heating elements are first driven and/or when the heating sequence first begins), temperature (e.g., detected by a temperature sensor in the cooking chamber or on the cooking platform) within the cooking instrument, user input (e.g., via an external device connected to the computing device or a control panel of the cooking instrument), temperature within the food (e.g., as reported by a temperature probe inserted into the food and communicatively coupled to the computing device), real-time or asynchronous image analysis of the food, real-time or asynchronous audio signal analysis from a microphone inside or outside of the cooking instrument, real-time or asynchronous environment sensor output analysis, other data received over a network, other data generated by a component of the cooking instrument, or any combination thereof. At step 408, the computing device can update, in real-time, the input variables and, at step 410, re-adjust the driving parameters to the heating elements of the heating system according to the heating sequence and/or the heat adjustment algorithm.

Part of the adjustment made by the heating sequence can include heat intensity, spectral power distribution and/or peak wavelength (e.g., for targeting different food or material within the cooking chamber), heat duration, target zone or cooking platform for heating, or any combination thereof. The computing device can configure the heating elements to apply different heating patterns to different zones (on the same cooking platform or different cooking platforms) in the cooking instrument. Each "zone" can be represented by an area on a cooking platform or a portion of food resting on the cooking platform. The computing device can configure the heating elements to apply, simultaneously or sequentially, different heating patterns to different zones on the cooking platform by supplying different amount of power and/or emission spectral power distributions to different heating elements. The computing device can configure the heating elements to apply different heating patterns to different zones on the cooking platform by driving the heating elements of the heating system at varying peak wavelengths. The cooking instrument can include a perforated metallic sheet between the cooking platform and at least one of the heating elements. The computing device can configure the heating elements to apply different heating patterns to different zones on the cooking platform by using the perforated metallic sheet to spatially block portions of waves emitted by the at least one of the heating elements.

At step 412, the computing device can compute, based on at least an instruction in the heating sequence, when to terminate the heating sequence (e.g., when the cooking instrument stops supplying power to the heating elements).

In some embodiments, the heating adjustment algorithm takes into account whether the food is expected to be extracted out of the cooking instrument substantially immediately after the termination of the heating process (e.g., a high-speed mode). For example, the heating adjustment algorithm can shorten the expected termination time if the user indicates that the food will remain in the cooking instrument a preset duration after the termination of the heating process (e.g., a low stress mode).

Figure 5A:
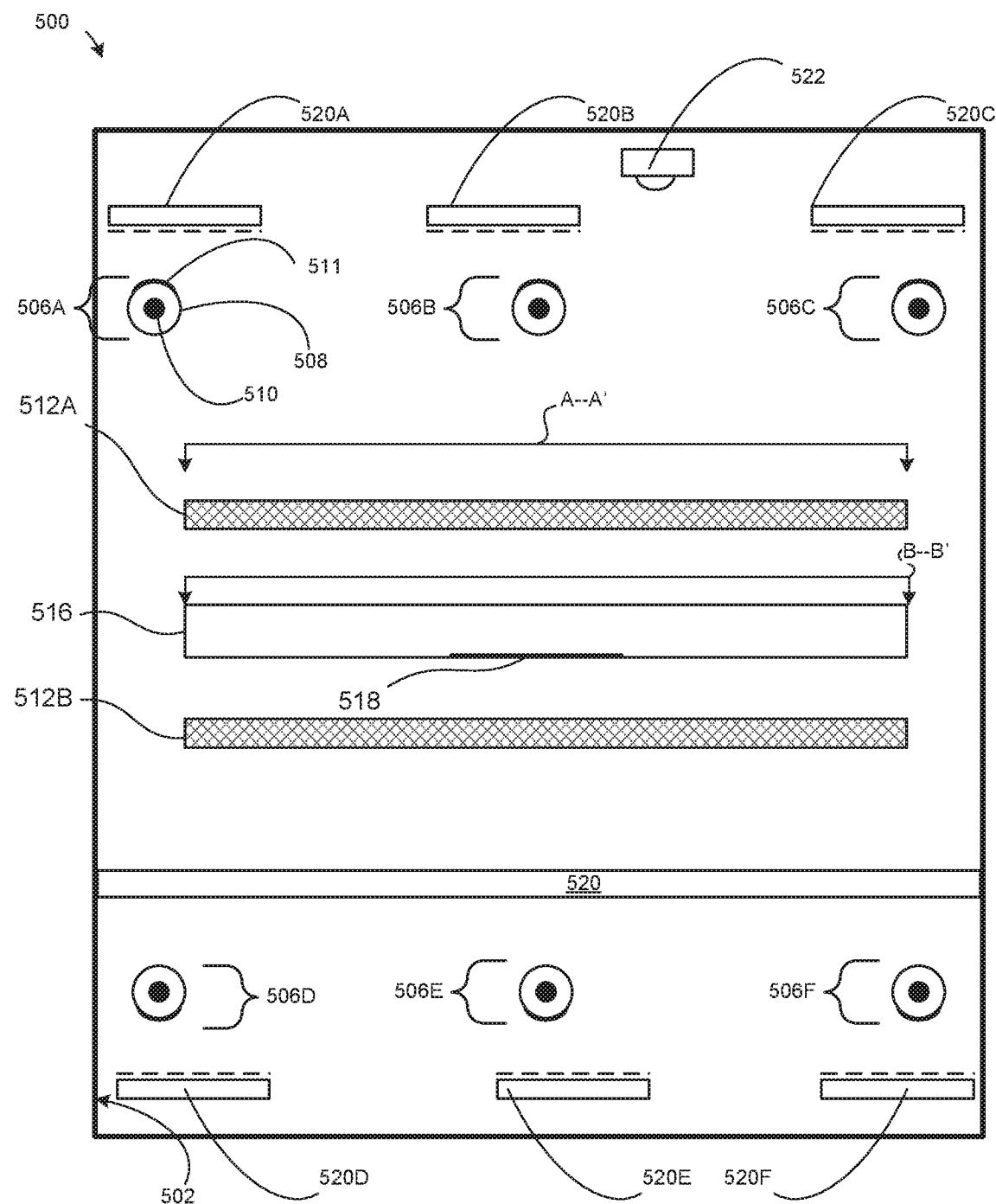
FIG. 5A is a cross-sectional front view of a first example of a cooking instrument, in accordance with various embodiments.

FIG. 5A is a cross-sectional front view of a first example of a cooking instrument 500 (e.g., the cooking instrument 100, the cooking instrument 200, and/or the cooking instrument 300), in accordance with various embodiments. The cooking instrument 500 includes a chamber 502 and a heating system (not labeled in FIG. 5A) with one or more filament assemblies 506 (e.g., a filament assembly 506A, a filament assembly 506B, a filament assembly 506C, a filament assembly 506D, a filament assembly 506E, a filament assembly 506F, etc., collectively as the "filament assemblies 506") at one or more locations in the chamber 502. The filament assemblies 506 can respectively be part of the heating elements of the cooking instrument 500. Each of the filament assemblies 506 can include a containment vessel 508 surrounding a filament 510.

The containment vessel 508 can be coated with reflective material to serve as a reflector 511. This way, the reflector 511 is prevented from being fouled by debris. The containment vessel 508 can be made of quartz. The reflective material can be gold or white ceramics, such as zirconium oxide, silicon oxide, etc. The filament assemblies 506 can be tungsten halogen assemblies. The reflective material can be coated on a portion of an outer surface of each of filament assemblies 506 or the containment vessel 508 that faces away from a cooking platform 516. In some embodiments, the reflector 511 is a separate component than each of the filament assemblies 506 and the containment vessel 508. For example, each of the reflector 511 can be positioned adjacent to each of the filament assemblies 506 away from the center of the cooking chamber. In some embodiments, the reflector 511 is placed close enough to each of the filament assemblies 506 such that during normal operations (e.g., approximately 450 Fahrenheit or above), debris is burnt off between the corresponding reflector 511 and each of the filament assemblies 506. In some embodiments, at least one of the filament assemblies 506 is between the reflector 511 and a glass covering. In some embodiments, a glass covering is between at least one of the filament assemblies 506 and the reflector 511.

In some embodiments, the containment vessel 508 does not need a reflector. In some embodiments, the reflector 511 can be external to the containment vessel 508. Anti-fouling can be achieved by choosing a distance between the reflector 511 (e.g., in the case that it is external to the containment vessel 508) and the containment vessel 508 such that undesirable materials are burnt off the reflector 511 and/or the containment vessel 508. In some embodiments, the reflector 511 and/or the containment vessel 508 can be shielded from debris directly using another (transparent) material. In some embodiments, the filament assemblies 506 each has an end cap made of ceramic substance. The filament 510 can be wounded to dramatically increase total length of filament without increasing the length of the filament assembly. The filament 510 can be wound uniformly or non-uniformly. Ends of the filament 510 can be sealed with molybdenum foil while maintaining electrical conductivity. The filament 510 can be wound with varying diameter or uniform diameter.

Figure 5B:
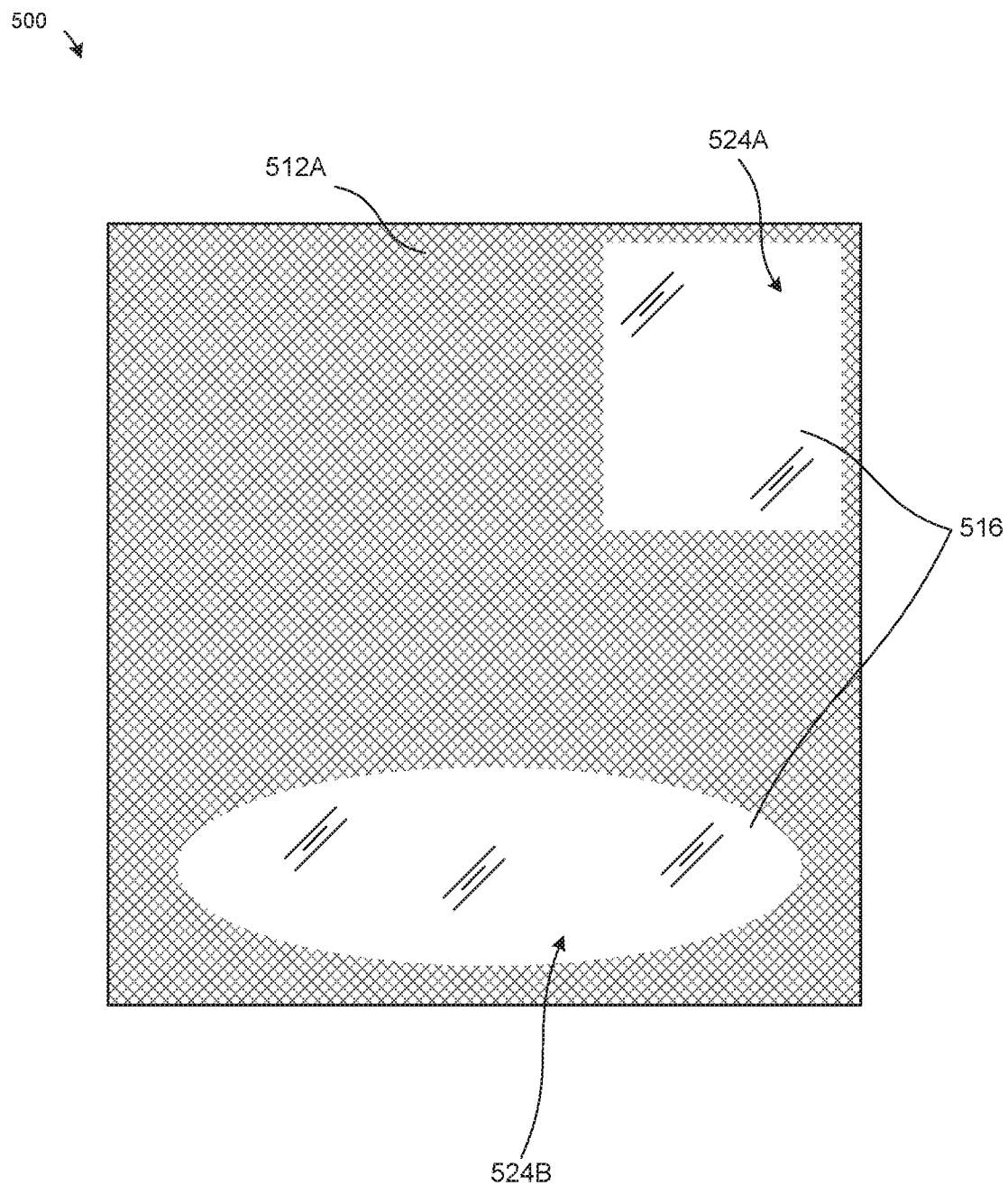
FIG. 5B is a cross-sectional top view of the cooking instrument of FIG. 5A along lines A-A', in accordance with various embodiments.
Figure 5C:
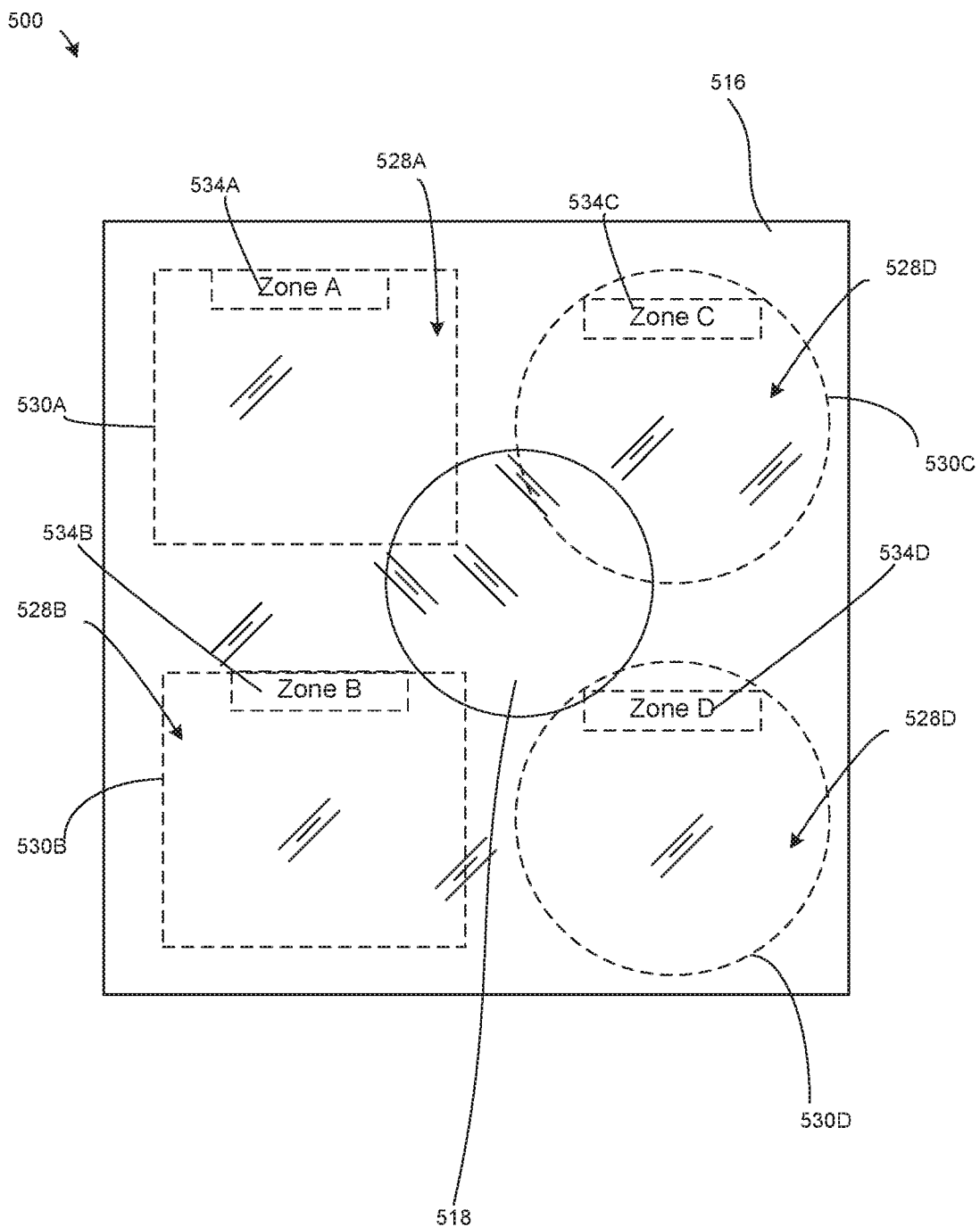
FIG. 5C is a cross-sectional top view of the cooking instrument of FIG. 5A along lines B-B', in accordance with various embodiments.
Figure 5D:
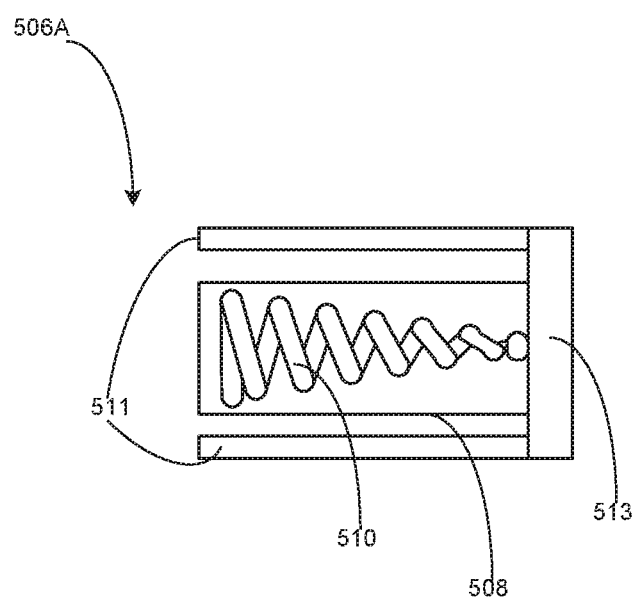
FIG. 5D is an example cross-section of one of the filament assemblies, in accordance with various embodiments.

FIG. 5D is an example cross-section of one of the filament assemblies 506, in accordance with various embodiments. In this example, the filament assembly 506A includes the containment vessel 508 surrounding the filament 510. The filament assembly 506A can include an end cap 513 (e.g., of ceramic substance). The filament 510 can be wounded. The filament assembly 506A can have reflector 511 external to and surrounding the containment vessel 508. In some embodiments, the reflector 511 can be attached to the end cap 513. In some embodiments, the reflector 511 is not attached to the end cap 513 (not shown).

A computing device (e.g., the computing device 206) can be configured to control the emission spectral power distribution (e.g., including one or more peak emission wavelengths) of the filament assemblies 506, individually, in subsets, or as a whole. For example, the computing device can be configured to identify a food profile associated with food (e.g., in the chamber 502) based on sensor input (e.g., camera scanning a label) and/or the user input. The computing device can then determine one or more excitable wavelengths associated with the food profile. For example, the excitable wavelengths can correspond to resonant frequencies of the food material(s) associated with the food profile. The computing device can drive one or more (e.g., a single assembly up to all) of the filament assemblies 506 to emit at a peak emission wavelength corresponding to at least one of the excitable wavelengths to heat the food.

In some embodiments, the chamber 502 is entirely enclosed in metal. In some embodiments, the chamber 502 has the door. In some embodiments, the chamber 502 has one or more transparent windows (e.g., glass windows). In some embodiments, one or more perforated metal sheets 512 (e.g., a perforated metal sheet 512A and/or a perforated metal sheet 512B, collectively as the "perforated metal sheets 512") are disposed within the chamber 502. In some embodiments, there is only a single perforated metal sheet in the chamber 502 (e.g., above the cooking platform 516 or below the cooking platform 516). In some embodiments, there are two perforated metal sheets (as shown). Each of the perforated metal sheets 512 can be a removable or affixed panel. The perforated metal sheets 512 can enable control of heating concentration along a horizontal plane parallel its surface. Perforated metal sheets, such as a perforated aluminum foil, can be used to shield certain food items from the intense radiant heat generated by the filament assemblies 506. For example, when cooking a steak and vegetables side-by-side, the perforated metal sheets can shield the vegetables from being overcooked and enable the steak to receive the full power from the filament assemblies 506. Longer wavelength emission from the filament assemblies 506 can penetrate perforations more equally compared to shorter wavelength. Hence even if the perforations were designed to shield, for example, 90% of direct radiant heat, the cooking instrument can still independently tune the spatial concentration of the heating by varying the wavelength. This enables some control of side-by-side cooking in addition to direct radiant heating.

In some embodiments, the filament assemblies 506 are adapted to emit directional electromagnetic waves. Directionality of the emitted waves can be enabled by the shape and/or location of the reflector 511, the structure, shape, and/or location of the containment vessel 508, the structure and/or shape of the filament 510, or any combination thereof. In some embodiments, the perforated metal sheets 512 further restricts the spatial concentration of the emitted waves. In some embodiments, at least some of the filament assemblies 506 are adapted to emit unidirectional electromagnetic waves.

In some embodiments, the chamber 502 includes the cooking platform 516 (e.g., the cooking platform 110) in the chamber 502. In some embodiments, the cooking platform 516 includes or is part of at least one of the one or more perforated metal sheets 512. The computing device can be configured to drive the filament assemblies 506 to emit at a spectral power distribution including a peak emission wavelength corresponding to excitable wavelength for the cooking platform 516. By tuning to include the peak emission wavelength to the excitable wavelength of the cooking platform 516, the computing device can heat up the cooking platform 516 without directly heating the air or the food inside the chamber 502.

The cooking platform 516 can be made of glass or metal. The cooking platform 516 can include an optically transparent region, such as via glass or glass-like material, enabling visible light to substantially travel through two opposing surfaces of the cooking platform 516. For example, prior to heating, a user of the cooking instrument 500 can place an instruction sheet beneath the cooking platform 516 while arranging food on the cooking platform 516 to be cooked. The user can directly overlay specific food at the desired location according to the instruction sheet. In some embodiments, the cooking platform 516 includes a reflective portion 518 to enable a top side camera 522 to capture a bottom view of food resting on the cooking platform 516.

In some embodiments, the cooking instrument 500 includes an airflow-based cooling system (e.g., including a cooling unit 520A, a cooling unit 520B, a cooling unit 520C, a cooling unit 520D, a cooling unit 520E, and a cooling unit 520F, collectively as the "cooling system 520"). The airflow-based cooling system 520 can blow directly onto a reflector portion of the containment vessel 508 to cool (e.g., prevent vaporization of the reflective coating) and/or improve performance of the reflector 511. The airflow can be controlled to provide impingement convection heating. The airflow-based cooling system 520 can have an air path that filters steam and thus prevents hot air from escaping when the door of the cooking instrument 500 is opened. The air path can also be configured to go over a camera (not shown) of the cooking instrument 500 to keep the lens of the camera condensation free. In some embodiments, air flow and convection can be achieved through passive, chimney like effects, for example holes or gaps can be installed in reflectors such that air super-heated through bulb/filament containment vessel contact will experience a reduction in density and thus buoyantly flow through such gaps.

In some embodiments, a fan can be installed away from the filament assemblies 506. When the spectral power distribution (including one or more peak wavelengths) of a filament assembly is configured to heat the envelope and/or the containment vessel 508, the fan can stir the air within the chamber 502 to ensure that heated air adjacent to the containment vessels 508 is moved to other parts of the chamber 502 to cook the food.

In some embodiments, the cooking instrument 500 lacks a crumb tray. Optionally, the cooking instrument 500 can use a heat resistant sheet 520 (e.g., quartz or other material) to cover the filament assemblies 506 so that the bottom of the cooking instrument chamber has no filament assemblies to trip over. The heat resistant sheet can be transparent at the operating wavelengths of the filament assemblies 506 to enable for the emission from the filament assemblies 506 to penetrate through without much loss.

In some embodiments, the computing device within the cooking instrument 500 can drive the filament assemblies 506 according to instructions in a cooking recipe. For example, the computing device can drive at least one of the filament assemblies 506 at a peak wavelength. The peak wavelength can correspond to excitable wavelengths of the materials in the cooking platform 516, the containment vessel 508 (e.g., envelope of the filament assembly), a specific type of edible material, water molecules, or any combination thereof. By matching a particular peak wavelength corresponding to an excitable wavelength of a target material, the computing device can target specific material for heating. For example, the computing device can drive at least one of the filament assemblies 506 at a peak wavelength (e.g., 3 µm or above for a glass cooking platform) such that the cooking platform 516 is substantially opaque to waves emitted from the at least one of the filament assemblies 506. The computing device can drive at least one of the filament assemblies 506 at a peak wavelength (e.g., 3 µm or less for glass cooking platforms) such that the cooking platform 516 is substantially transparent to waves emitted from the at least one of the filament assemblies 506. The computing device can drive at least one of the filament assemblies 506 at a peak wavelength (e.g., between 3 µm and 4 µm for glass cooking platforms) such that the cooking platform 516 is heated by waves emitted from the at least one of the filament assemblies 506 without substantially heating any organic food in the cooking chamber.

FIG. 5B is a cross-sectional top view of the cooking instrument 500 of FIG. 5A along lines A-A', in accordance with various embodiments. FIG. 5B can illustrate the perforated metal sheet 512A and cavities within the perforated metal sheet 512A that exposes the cooking platform 516. For example, the perforated metal sheet 512 includes a rectangular cavity 524A and an oval cavity 524B that exposes the cooking platform 516 underneath.

FIG. 5C is a cross-sectional top view of the cooking instrument 500 of FIG. 5A along lines B-B', in accordance with various embodiments. FIG. 5C can illustrate the cooking platform 516. In embodiments where the cooking platform 516 is transparent or semitransparent, the reflective portion 518 may be visible from the cross-sectional top view.

In some embodiments, the cooking platform 516 can be virtually divided into cooking target zones (e.g., zone 528A, zone 528B, zone 528C, and zone 528D, collectively as the "cooking target zones 528"). That is, food cooking recipes and heating sequences can reference these cooking target zones 528. Each of the cooking target zones 528 can be defined by physically visible perimeters (e.g., a zone A perimeter 530A, a zone B perimeter 530B, a zone C perimeter 530C, and a zone D perimeter 530D, collectively as the "visible perimeters 530"). The visible perimeters 530 can be of different sizes and shapes (e.g., overall or rectangular). In some embodiments, the visible perimeters 530 can be marked by heat resistant paint. In some embodiments, the visible perimeters 530 can be defined by structural channeled edges or beveled edges in the cooking platform 516. In some embodiments, each of the visible perimeters 530 can be defined by the corresponding cooking target zone being terraced (e.g., elevated or depressed).

In some embodiments, the cooking target zones 528 can include visible labels (e.g., a zone A label 534A, a zone B label 534B, a zone C label 534C, and a zone D label 534D, collectively as the "visible labels 534"). The visible labels 534 can advantageously provide a clear reference for a user to know where to place portions of food as instructed by the cooking instrument 500 (e.g., via displayed information related to instructions associated with a cooking recipe).

Figure 6:
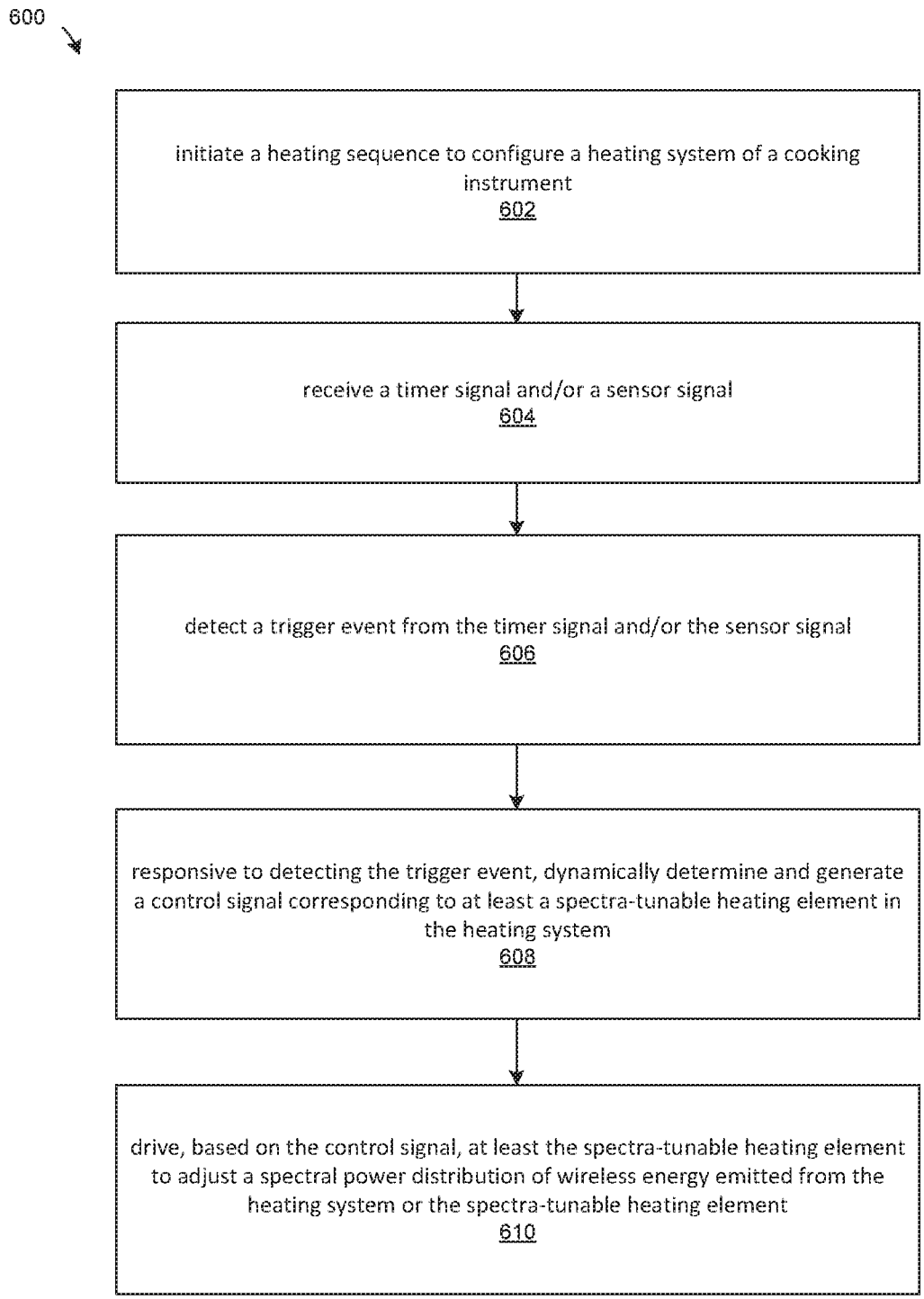
FIG. 6 is a flow chart illustrating a method of operating a cooking instrument, in accordance with various embodiments.

FIG. 6 is a flow chart illustrating a method 600 of operating a cooking instrument (e.g., the cooking instrument 100, the cooking instrument 200, and/or the cooking instrument 500), in accordance with various embodiments. The method 600 can be executed by a control system (e.g., the computing device 206) of the cooking instrument. At step 602, the control system can initiate a heating sequence to configure a heating system (e.g., the heating system 216) of the cooking instrument. For example, configuration of the heating system includes configuration of individual spectra-tunable heating elements. For example, a spectra-tunable heating element is a heating element configured to emit electromagnetic waves with a particular spectral power distribution as dictated by the control system. The control system can select the particular spectral power distribution from a set of two or more spectral power distribution templates. The control system can cause the spectra-tunable heating element to emit under whichever selected spectral power distribution by providing a control signal to the spectra-tunable heating element or modulating the power provided to the spectra-tunable heating element. The heating sequence can include instructions to configure at least a spectra-tunable heating element of the heating system.

At step 604, the control system can then receive a timer signal and/or a sensor signal. The timer signal can be a continuous data stream of time indicators or discrete data packets (e.g., periodic or otherwise) indicative of time. The sensor signal can be a continuous data stream of sensor measurements or discrete sensor measurements (e.g., periodic or otherwise). The continuous data streams can be uninterrupted while the heating system is operating.

At step 606, the control system can detect a trigger event from the timer signal and/or the sensor signal. Responsive to detecting the trigger event, at step 608, the control system can dynamically determine and generate a control signal corresponding to at least the spectra-tunable heating element in the heating system. At step 610, the control system can drive, based on the control signal, at least the spectra-tunable heating element to adjust a spectral power distribution of wireless energy emitted from the heating system or the spectra-tunable heating element. Driving the heating system can include adjusting the spectral power distribution of the wireless energy by selectively turning off or selectively reducing intensity of power supplied to the at least one heating element in the heating system.

In some embodiments, the heating system adjusts the spectral power distribution while preserving the total output power of the heating system, such as by increasing an output intensity for a first wavelength spectrum while reducing an output intensity for a second wavelength spectrum. In some embodiments, the heating system adjusts the spectral power distribution without preserving the total output power. The first wavelength spectrum can be longer or shorter than the second wavelength spectrum. In the case that the first wavelength spectrum is longer, the heating system or the spectra-tunable heating element essentially targets direct heat transfer to a material with an absorption band that is longer in wavelength. In the case that the first wavelength spectrum is shorter, the heating system or the spectra tunable heating element essentially targets direct heat transfer with an absorption band that is shorter in wavelength.

In some embodiments, adjusting the spectral power distribution includes adjusting spectral power distribution of wireless energy emitted from only a subset of heating elements in the heating system. Here, "only a subset" means less than all of the heating elements in the heating system.

While processes or methods are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 7:
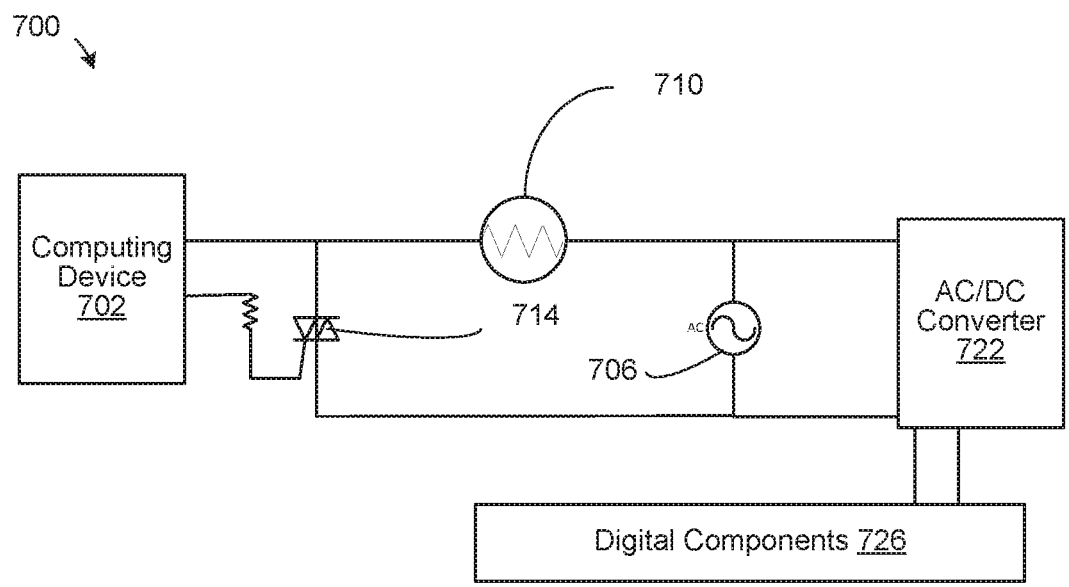
FIG. 7 is a simplified circuit diagram illustrating electrical connections of a power supply of a cooking instrument, in accordance with various embodiments.

FIG. 7 is a simplified circuit diagram illustrating electrical connections of a power supply 700 (e.g., the power supply 202) of a cooking instrument (e.g., the cooking instrument 200), in accordance with various embodiments. The power supply 700 can be controlled by a computing device 702 (e.g., an analog control circuitry, application-specific integrated circuit (ASIC), a general-purpose processor/controller configurable by firmware or software, or any combination thereof). The power supply 700 can draw power from an AC power source 706.

The power supply 700 can include electric component(s) for driving at least a heating element 710 of a heating system (the heating system 216) of the cooking instrument. For example, a switchable relay 714 can be electrically coupled to the heating element 710. The switchable relay 714 can be electrically coupled to the computing device 702 such that the computing device 702 can control (e.g., via a control signal) whether power is supplied from the AC power source 706 to the heating element 710. In some embodiments, the computing device 702 can also control how (e.g., pulse modulation) and how much power is provided to the heating element 710. In some embodiments, the switchable relay 714 can provide half waves of the AC power to the heating element 710. In some embodiments, the switchable relay 714 includes a TRIAC. In some embodiments, the power supply 700 includes multiple instances of the switchable relay 714 respectively corresponding to multiple instances of the heating element 710.

The power supply 700 can include electric elements for supplying the DC power to digital components of the cooking instrument, including for example, the computing device 702. For example, the power supply 700 includes an AC/DC converter 722 electrically coupled between the AC power source 706 and digital components 726 of the cooking instrument. In some embodiments, the digital components 726 includes the computing device 702.

FIG. 8 is a graph illustrating a temperature trace 800 of a heating element over time using an unmodulated method of driving the heating element. In the illustrated example, at an initial time t0 802, the power to the heating element is turned on (e.g., from no power to a constant supply of DC power or rectified AC power). At the initial time 802, the temperature of the heating element is substantially the same as the temperature in a cooking chamber (chamber temperature) that the heating element is in. After the initial time 802, there is a ramp-up period 806. During the ramp-up period 806, the temperature of the heating element increases drastically prior to reaching a point of equilibrium 810. At the point of equilibrium 810, the rate of temperature dissipation of the heating element becomes substantially equal to the rate of temperature increase due to the electrical driving power. After the power turns off at termination time tf, 814, the temperature of the heating element decreases (e.g., approximately an exponential decay) until it reaches the chamber temperature.

The total heater-on time 816 starts from the initial time 802 to the termination time 814. Because a substantially constant temperature is only maintained from the point of equilibrium 810 to the termination time 814 and because the emission spectral power distribution of the heating element depends on the temperature, a substantially constant cooking characteristic is maintained from the point of equilibrium 810 to the termination time 814. This unmodulated method of driving the heating element can only maintain a single cooking characteristic by relying on the heat dissipation equilibrium.

Figure 9:
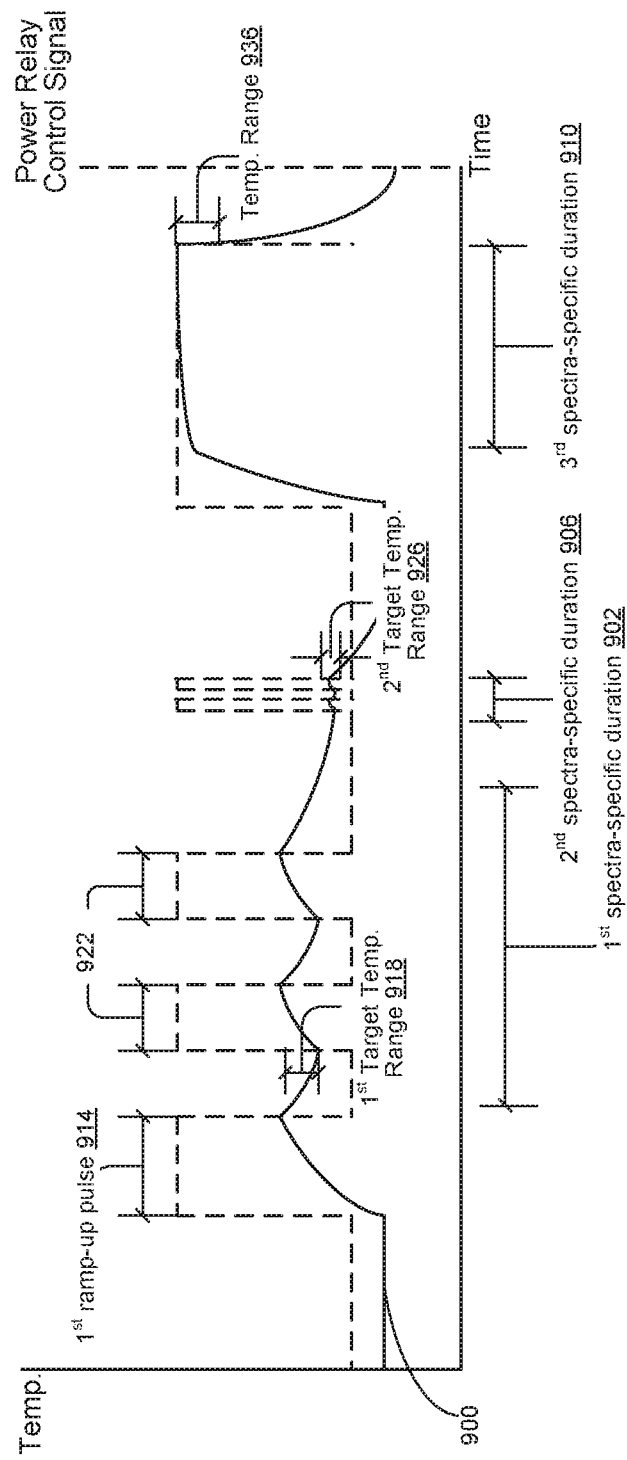
FIG. 9 is a graph illustrating a temperature trace of a heating element over time using a pulse modulation method of driving the heating element, in accordance with various embodiments.

FIG. 9 is a graph illustrating a temperature trace 900 of a heating element over time using a pulse modulation method of driving the heating element, in accordance with various embodiments. While the temperature trace 900 illustrates just a first spectra-specific duration 902, a second spectra-specific duration 906, and a third spectra-specific duration 910, the pulse modulation method of the various embodiments can support more than three emission spectral power distribution configurations for the heating element.

In the illustrated example, in the first spectra-specific duration 902, the heating element can be driven by a series of electrical pulses. During a first ramp-up time 914, the temperature trace 900 of the heating element rises until it reaches the maximum amount in a first target temperature range 918. The temperature trace 900 then decays until a series of electrical pulses 922 starts to drive the heating element. The temperature of the heating element then rises (during each of the electrical pulses 922) and falls (between each of the electrical pulses 922) within the first target temperature range 918. As described above, because the spectral power distribution of waves emitted from the heating element corresponds to the temperature of the heating element and because the temperature of the heating element is maintained within the first target temperature range 918, the electrical pulses 922 substantially maintain the spectral power distribution of the waves emitted from the heating element within a tolerable variance corresponding to the first target temperature range 918. In some embodiments, each electrical pulse comprises one or more rectified half waves of AC power cycles. In some embodiments, each electrical pulse can be a DC pulse (e.g., square waves).

Utilizing different pulse modulation configurations (e.g., different pulse width/duty cycle and different pulse frequency), the temperature can be kept at a second target temperature range 926 in the second spectra-specific duration 906. The pulse modulation method can also still utilize the temperature dissipation equilibrium similar to the graph in FIG. 8. In the third spectra-specific duration 910, the heating element can be driven by a wide pulse of rectified power signal to maintain the temperature within a third target temperature range 936. For example, the wide pulse can be the pulse modulation at a higher wavelength than the pulse modulation during the first spectra specific duration 902.

Below are non-limiting examples of embodiments, including

Example 1: A cooking instrument comprising: a cooking chamber; a heating system including at least a tunable heating element capable of emitting wireless energy into the cooking chamber; and a control system configured to: determine a food substance or a food cooking recipe, generate, based on an identity of the food substance or the food cooking recipe, a heating sequence to drive the heating system, wherein the heating sequence includes an instruction to adjust a spectral power distribution of the emitted wireless energy based on a trigger event, detect the trigger event specified by the heating sequence, and responsive to detecting the trigger event, configure the heating system to adjust the spectral power distribution of the emitted wireless energy from the tunable heating element.

Example 2: same or similar to example 1, further comprising a power supply, wherein the power supply is adapted to supply electrical power to the tunable heating element as dictated by the control system.

Example 3: same or similar to example 2, wherein the control system is configured to adjust the spectral power distribution of the tunable heating element by adjusting a duration that the power supply is supplying power to the tunable heating element.

Example 4: same or similar to example 3, further comprising a memory storing a driver parameter associated with the spectral power distribution or at least a characteristic thereof; wherein the control system is configured to adjust the duration based on the driver parameter.

Example 5: same or similar to example 2, wherein the power supply includes a power switch (e.g., a binary or multistate power control mechanism) capable of switching power to the tunable heating element in two or more states (e.g., on or off).

Example 6: same or similar to example 5, wherein the control system is configured to adjust the spectral power distribution of the tunable heating element to a target spectral power distribution by modulating (e.g., pulse modulating) power provided to the tunable heating element using the power switch.

Example 7: same or similar to example 6, wherein the control system is configured to slow the modulating of the power switch when an estimated temperature of the tunable heating element is above a threshold temperature, when the power switch has been in a particular state for more than a threshold duration, or when the power switch has been in a particular state for more than a threshold amount in a preset duration.

Example 8: same or similar to example 5, wherein the power supply or the control system includes a temperature-dependent resistor electronically coupled to the power switch.

Example 9: same or similar to example 5, wherein the power supply or the control system includes a digital power chopper with an adjustable chop rate.

Example 10: same or similar to example 1, further comprising a memory storing an association between a target object category in the cooking chamber and a wavelength-specific configuration associated with adjustment of the spectral power distribution; and wherein the control system is configured to: determine that the food substance or an intermediary heating medium is in the target object category, and drive, based on the stored association, the heating system according to the wavelength-specific configuration.

Example 11: same or similar to example 1, the trigger event is a time-based event, a user indicated event, a sensor data indicated event, or any combination thereof.

Example 12: same or similar to example 1, wherein the instruction specifies the trigger event as corresponding to a target spectral power distribution, wherein the instruction includes or references a logic function or a lookup table to identify a wavelength-specific configuration associated with the target spectral power distribution, and wherein the control system is configured to drive, based on the logic function or the lookup table, the heating system according to the wavelength-specific configuration.

Example 13: same or similar to example 1, wherein the heating system includes multiple tunable heating elements, and wherein each of the multiple tunable heating elements is individually tunable to change its emission spectral power distribution independent of others heating elements.

Example 14: A method of operating a cooking instrument, comprising: initiating, at a control system of the cooking instrument, a heating sequence to configure a heating system of the cooking instrument; receiving, at the control system, a timer signal or a sensor signal; detecting a trigger event from the timer signal or the sensor signal; responsive to detecting the trigger event, dynamically determining a control signal corresponding to at least one spectra-tunable heating element of the heating system; and driving the at least one spectra-tunable heating element based on the control signal to adjust a spectral power distribution of wireless energy emitted from the at least one spectra-tunable heating element.

Example 15: same or similar to example 14, wherein the control signal controls power provided to the spectra-tunable heating element.

Example 16: same or similar to example 14, wherein driving the at least one spectra-tunable heating element includes adjusting a spectral power distribution of wireless energy emitted from only a subset of heating elements in the heating system.

Example 17: same or similar to example 14, wherein the timer signal or the sensor signal is a continuous data stream un-interrupted while the heating system is operating.

Example 18: same or similar to example 14, wherein adjusting the spectral power distribution includes increasing an output intensity for a first wavelength spectrum while reducing an output intensity for a second wavelength spectrum.

Example 19: same or similar to example 14, wherein driving the at least one spectra-tunable heating element includes adjusting the spectral power distribution of the wireless energy by selectively turning off or selectively reducing intensity of power supplied to the at least one spectra-tunable heating element in the heating system.

Example 20: A cooking instrument comprising: a cooking chamber; a heating system including at least a tunable heating element capable of emitting wireless energy into the cooking chamber; and a control system configured to: determine a food substance or a food cooking recipe, generate, based on an identity of the food substance or the food cooking recipe, a heating sequence to drive the heating system, wherein the heating sequence includes an instruction to simultaneously adjust, based on a trigger event detectable by the control system, a plurality of spectral power distributions of wireless waves emitted respectively from the multiple heating elements in the heating system, detect the trigger event specified by the heating sequence, and responsive to detecting the trigger event, configure the heating system to adjust the spectral power distribution of the emitted wireless energy from the tunable heating element.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

Some embodiments of the disclosure have other aspects, elements, features, and steps in addition to or in place of what is described above. These potential additions and replacements are described throughout the rest of the specification.

The invention claimed is:

1. A cooking instrument comprising:
   a cooking chamber;
   a heating system including at least a tunable heating element comprising a wavelength controllable tungsten filament assembly capable of emitting wireless energy into the cooking chamber; and
   a control system configured to:
      determine a food substance or a food cooking recipe comprising the food substance,
      generate, based on an identity of the food substance or the food cooking recipe, a heating sequence to drive the heating system, wherein the heating sequence includes a first instruction to emit at a peak emission wavelength corresponding to a first excitable wavelength of the food substance; and wherein the heating sequence includes a second instruction to adjust a spectral power distribution of the emitted wireless energy based on a trigger event,
      detect the trigger event specified by the heating sequence, and
      responsive to detecting the trigger event, configure the heating system to adjust the spectral power distribution of the emitted wireless energy from the tunable heating element to target a second excitable wavelength of the food substance and/or one or more materials in the cooking chamber, by generating a control signal to adjust modulation of the power provided to the tunable heating element.

2. The cooking instrument of claim 1, further comprising a power supply, wherein the power supply is adapted to supply electrical power to the tunable heating element as dictated by the control system.

3. The cooking instrument of claim 2, wherein the control system is configured to adjust the spectral power distribution of the tunable heating element by adjusting a duration that the power supply is supplying power to the tunable heating element.

4. The cooking instrument of claim 3, further comprising a memory storing a driver parameter associated with the spectral power distribution or at least a characteristic thereof; wherein the control system is configured to adjust the duration based on the driver parameter.

5. The cooking instrument of claim 2, wherein the power supply includes a power switch capable of switching power to the tunable heating element in two or more states.

6. The cooking instrument of claim 5, wherein the control system is configured to adjust the spectral power distribution of the tunable heating element to a target spectral power distribution by modulating using the power switch to generate a series of electrical pulses during a first ramp-up time until a temperature of the at least one spectra tunable heating element reaches a maximum amount in a first target temperature range, and maintain the temperature of the at least one spectra tunable heating element in the first target temperature range, wherein the temperature rises during each electrical pulse and falls between each electrical pulse.

7. The cooking instrument of claim 6, wherein the control system is configured to slow the modulating of the power switch when an estimated temperature of the tunable heating element is above a threshold temperature, when the power switch has been in a particular state for more than a threshold duration, or when the power switch has been in a particular state for more than a threshold amount in a preset duration.

8. The cooking instrument of claim 5, wherein the power supply or the control system includes a temperature-dependent resistor electronically coupled to the power switch.

9. The cooking instrument of claim 5, wherein the power supply or the control system includes a digital power chopper with an adjustable chop rate.

10. The cooking instrument of claim 1, further comprising a memory storing an association between a target object category in the cooking chamber and a wavelength-specific configuration associated with adjustment of the spectral power distribution; and wherein the control system is configured to:
   determine that the food substance or an intermediary heating medium is in the target object category, and
   drive, based on the stored association, the heating system according to the wavelength-specific configuration.

11. The cooking instrument of claim 1, the trigger event is a time-based event, a user indicated event, a sensor data indicated event, or any combination thereof.

12. The cooking instrument of claim 1, wherein the second instruction specifies the trigger event as corresponding to a target spectral power distribution, wherein the second instruction includes or references a logic function or a lookup table to identify a wavelength-specific configuration associated with the target spectral power distribution, and wherein the control system is configured to drive, based on the logic function or the lookup table, the heating system according to the wavelength-specific configuration.

13. The cooking instrument of claim 1, wherein the heating system includes multiple tunable heating elements, and wherein each of the multiple tunable heating elements is individually tunable to change its emission spectral power distribution independent of others.

14. A method of operating a cooking instrument, comprising:
   initiating, at a control system of the cooking instrument, a heating sequence to configure a heating system of the cooking instrument, the heating sequence comprising an instruction to emit at a peak emission wavelength corresponding to a first excitable wavelength of a food substance;
   receiving, at the control system, a timer signal or a sensor signal;
   detecting a trigger event from the timer signal or the sensor signal;
   responsive to detecting the trigger event, dynamically determining a control signal corresponding to at least one spectra-tunable heating element of the heating system comprising a wavelength controllable tungsten filament assembly; and
   driving the at least one spectra-tunable heating element based on the control signal to adjust a spectral power distribution of wireless energy emitted from the at least one spectra-tunable heating element to target a second excitable wavelength of the food substance and/or one or more materials in the cooking chamber, by adjusting a modulation of the power provided to the heating element.

15. The method of claim 14, wherein the control signal controls power provided to the spectra-tunable heating element.

16. The method of claim 14, wherein driving the at least one spectra-tunable heating element includes adjusting a spectral power distribution of wireless energy emitted from only a subset of heating elements in the heating system.

17. The method of claim 14, wherein the timer signal or the sensor signal is a continuous data stream uninterrupted while the heating system is operating.

18. The method of claim 14, wherein adjusting the spectral power distribution includes increasing an output intensity for a first wavelength spectrum while reducing an output intensity for a second wavelength spectrum.

19. The method of claim 14, wherein driving the at least one spectra-tunable heating element comprises:
   driving the at least one spectra tunable heating element using a series of electrical pulses during a first ramp-up time until a temperature of the at least one spectra tunable heating element reaches a maximum amount in a first target temperature range;
   maintaining the temperature of the at least one spectra tunable heating element in the first target temperature range, wherein the temperature rises during each electrical pulse and falls between each electrical pulse;
   adjusting the spectral power distribution of the wireless energy by selectively turning off or selectively reducing intensity of power supplied to the at least one spectra-tunable heating element in the heating system.

20. A cooking instrument comprising:
   a cooking chamber;
   a heating system including multiple tunable heating elements comprising wavelength controllable tungsten filament assemblies capable of emitting wireless energy into the cooking chamber; and
   a control system configured to:
      determine a food substance or a food cooking recipe comprising the food substance,
      generate, based on an identity of the food substance or the food cooking recipe, a heating sequence to drive the heating system, wherein the heating sequence includes a first instruction to emit at a peak emission wavelength corresponding to a first excitable wavelength of the food substance, and wherein the heating sequence includes a second instruction to simultaneously adjust, based on a trigger event detectable by the control system, a plurality of spectral power distributions of wireless waves emitted respectively from the multiple heating elements in the heating system,
      detect the trigger event specified by the heating sequence, and
      responsive to detecting the trigger event, configure the heating system to adjust the spectral power distribution of the emitted wireless energy from one or more of the multiple tunable heating elements to target a second excitable wavelength of the food substance and/or one or more materials in the cooking chamber, by generating a control signal to adjust modulation of the power provided to the tunable heating elements.

* * * * *